US011222497B2

(12) United States Patent
Kobayashi et al.

(10) Patent No.: US 11,222,497 B2
(45) Date of Patent: Jan. 11, 2022

(54) MONEY HANDLING SYSTEM

(71) Applicant: GLORY LTD., Hyogo (JP)

(72) Inventors: Kiyoaki Kobayashi, Himeji (JP); Koichi Nishida, Himeji (JP)

(73) Assignee: GLORY LTD., Hyogo (JP)

( * ) Notice: Subject to any disclaimer, the term of this patent is extended or adjusted under 35 U.S.C. 154(b) by 343 days.

(21) Appl. No.: 16/099,899

(22) PCT Filed: Apr. 24, 2017

(86) PCT No.: PCT/JP2017/016184
§ 371 (c)(1),
(2) Date: Nov. 8, 2018

(87) PCT Pub. No.: WO2017/195579
PCT Pub. Date: Nov. 16, 2017

(65) Prior Publication Data
US 2019/0147683 A1 May 16, 2019

(30) Foreign Application Priority Data
May 11, 2016 (JP) ............................ JP2016-095619

(51) Int. Cl.
*G07D 11/13* (2019.01)
*G07D 9/00* (2006.01)
(Continued)

(52) U.S. Cl.
CPC ............. *G07D 11/13* (2019.01); *G07D 7/206* (2017.05); *G07D 9/00* (2013.01); *G07D 11/125* (2019.01);
(Continued)

(58) Field of Classification Search
CPC ... G06F 2200/1614; G06F 2203/04803; G06F 3/0346; G06F 3/048; G06F 3/04845; G06F 3/04886; H04M 1/72519; H04M 2201/42
(Continued)

(56) References Cited

U.S. PATENT DOCUMENTS 5,984,177 A * 11/1999 Do ........................ G07F 19/205 235/379
6,276,602 B1 * 8/2001 Henderson ............. G07F 19/20 235/379
(Continued)

FOREIGN PATENT DOCUMENTS

JP H03-50694 3/1991
JP 04-172594 6/1992
(Continued)

OTHER PUBLICATIONS

Japanese Office Action in related Japanese Application No. JP2016-095619, dated Jun. 15, 2020 (along with English-language translation thereof).
(Continued)

*Primary Examiner* — Thien M Le
*Assistant Examiner* — Tae W Kim
(74) *Attorney, Agent, or Firm* — Greenblum & Bernstein, P.L.C.

(57) ABSTRACT

A money handling system includes a money handling apparatus (for example, a coin handling apparatus (1)) configured to handle money and a placing unit (90) on which the money handling apparatus is placed and provided with an orientation change mechanism for changing an orientation of the money handling apparatus in a horizontal direction.

19 Claims, 13 Drawing Sheets

(51) Int. Cl.

| | |
|---|---|
| ***G07D 13/00*** | (2006.01) |
| ***G07F 19/00*** | (2006.01) |
| ***G07G 1/00*** | (2006.01) |
| ***G07D 7/206*** | (2016.01) |
| ***G07D 11/125*** | (2019.01) |
| ***G07D 11/40*** | (2019.01) |
| ***G07D 11/25*** | (2019.01) |

(52) U.S. Cl.
CPC ............. *G07D 11/25* (2019.01); *G07D 11/40* (2019.01); *G07D 13/00* (2013.01); *G07F 19/202* (2013.01); *G07G 1/0018* (2013.01)

(58) Field of Classification Search
USPC .......................................................... 235/379
See application file for complete search history.

(56) References Cited

U.S. PATENT DOCUMENTS

| | | | | |
|---|---|---|---|---|
| 2012/0228466 | A1* | 9/2012 | Haidvogl ............... | F16M 11/00 248/679 |
| 2015/0243117 | A1 | 8/2015 | Higashiyama et al. | |

FOREIGN PATENT DOCUMENTS

| | | | | |
|---|---|---|---|---|
| JP | 2001-250142 | | 9/2001 | |
| JP | 2003-177838 | | 6/2003 | |
| JP | 2010020370 | | 1/2010 | |
| JP | 2012-150846 | | 8/2012 | |
| JP | 2013-020301 | | 1/2013 | |
| KR | 20170058152 A | * | 5/2017 | ......... G06F 3/04886 |

OTHER PUBLICATIONS

Japanese Office Action issued in counterpart Japanese application No. 2016-095619, dated Mar. 10, 2020 (and English translation thereof).
European Search Report, European Patent Office, Application No. 17795940.0, dated Nov. 27, 2019.
Chinese Office Action issued in corresponding Chinese application No. 201780028755.4, dated Apr. 16, 2020 (and English translation thereof).
International Search Report and Written Opinion issued in International Patent Application No. PCT/JP2017/016184, dated Aug. 1, 2017 (and English-language translation).
European Office Action issued in a counterpart European application No. 17795940.0, dated Nov. 30, 2020.
Summons to Attend Oral Proceedings in counterpart EP Application No. 17795940.0, dated May 21, 2021.

* cited by examiner

MONEY HANDLING SYSTEM

TECHNICAL FIELD

The present invention relates to a money handling system for handling money such as banknotes and coins.

BACKGROUND ART

As a money handling system which is installed in stores such as supermarkets and convenience stores, and performs deposit processing of banknotes and coins as proceeds from sales and dispense processing of banknotes and coins as change, various types are conventionally known (For example, see Japanese Patent Publication No. 2013-20301 (JP2013-20301A)). In the money handling system disclosed in Japanese Patent Publication No. 2013-20301, a banknote settlement apparatus and a coin settlement apparatus are arranged side by side, and these banknote settlement apparatus and coin adjustment apparatus are connected to a POS (point of sales) register. In the conventional money handling system, both the front side of the banknote settlement apparatus and the front side of the coin settlement apparatus are located to face a store clerk side or both are located to face a customer side. The store clerk or the customer can perform the deposit processing or the dispense processing via an operation unit disposed at the front side of the banknote settlement apparatus or the coin settlement apparatus. The operation unit of the banknote settlement apparatus or the coin settlement apparatus comprises, for example, an inlet and an outlet disposed at the front side of the banknote settlement apparatus or the coin settlement apparatus for depositing or dispensing money through them.

SUMMARY OF THE INVENTION

In the money handling system in which the banknote settlement apparatus and the coin settlement apparatus are arranged side by side, there is a desire to arrange only the coin settlement apparatus to face the customer side during the busy period, while both the banknote settlement apparatus and the coin settlement apparatus are arranged to face the store clerk side in the usual time period. However, in the conventional money handling system as disclosed in Japanese Patent Publication No. 2013-20301, it is not easy to frequently change an orientation of the coin settlement apparatus because the weight of the coin settlement apparatus is large. In particular, when arranging a plurality of settlement apparatuses side by side or arranging the settlement apparatus adjacently to the other equipment or wall, since the other adjacent settlement apparatus or device is obstacle, it is difficult to change the orientation of the settlement apparatus.

The present invention has been made in consideration of the above-mentioned points, and it is an object of the present invention to provide a money handling system in which an orientation of a money handling apparatus in a horizontal direction can be easily changed.

A money handling system of the present invention includes: a money handling apparatus configured to handle money; and a placing unit on which the money handling apparatus is placed and provided with an orientation change mechanism for changing an orientation of a front side of the money handling apparatus in a horizontal direction.

The money handling system of the present invention may further include an orientation detector configured to detect the orientation of the money handling apparatus with respect to the placing unit.

In the money handling system of the present invention, the orientation change mechanism may include a rotation mechanism configured to rotate the money handling apparatus around an axis extending in a vertical direction.

In this case, the rotation mechanism may be capable to change the orientation of the front side of the money handling apparatus from a first direction to a second direction being opposite to the first direction in the horizontal direction.

In the money handling system of the present invention, the placing unit may be provided with a slide mechanism for horizontally sliding the money handling apparatus.

In the money handling system of the present invention, the money handling apparatus may comprise two money handling apparatuses arranged adjacently and at least one of the money handling apparatus is placed on the placing unit provided with the orientation change mechanism.

In this case, a coin handling apparatus and a banknote handling apparatus may be arranged adjacently as the two money handling apparatuses, and the coin processing apparatus may be placed on the placing unit provided with the orientation change mechanism.

Further, height levels of upper surfaces of the money handling apparatuses may be approximately the same.

Further, front surfaces of the two money handling apparatuses, which are close to an inlet opening and outlet opening of money, may be aligned when the two money handling apparatuses face in the same direction.

Further, the placing unit on which at least one of the money handling apparatuses is placed may be provided with a slide mechanism for horizontally sliding the money handling apparatus, and side surfaces on a customer side of the two money handling apparatuses may be aligned when the two money handling apparatuses face in opposite directions.

In this case, the money handling apparatus placed on the placing unit provided with the orientation change mechanism and the slide mechanism may slide by the slide mechanism between a first position in which the side surfaces on the customer side of the two money handling apparatuses are aligned when the two money handling apparatuses face in opposite directions, a second position in which front surfaces of the two money handling apparatuses, which are close to an inlet opening and outlet opening of money, are aligned when the two money handling apparatuses face the same direction, and a third position in which the orientation of the money handling apparatus in the horizontal direction can be changed by the orientation change mechanism.

Further, a wiring for connecting the two money handling apparatuses may be disposed, and the wiring may extend between the placing unit provided with the orientation change mechanism and the money handling apparatus placed on the placing unit via the orientation change mechanism.

In the money handling system of the present invention, the money handling system may perform processing of money in different manners according to the orientation of the money handling apparatus with respect to the placing unit.

In this case, the money handling system may be capable of performing replenishment processing of money when the money handling apparatus faces a clerk side, and the money handling system may not be capable of performing replenishment processing of money when the money handling apparatus faces a customer side.

Alternatively, an overflow money storage for storing overflow money may not be used when the money handling apparatus faces a clerk side, and the overflow money storage is capable to be used when the money handling apparatus faces a customer side.

Alternatively, deposit processing of money may not be started unless an instruction to start deposit processing of money is accepted when the money handling apparatus faces a clerk side, and deposit processing of money may be started as money is put into an inlet of money when the money handling apparatus faces a customer side.

Alternatively, counterfeit money put into a housing may be capable to be sent to a place other than a counterfeit money storage when the money handling apparatus faces a clerk side, and counterfeit money put into the housing may be sent only to the counterfeit money storage when the money handling apparatus faces a customer side.

Alternatively, a shutter provided with an outlet of money may not be operated and the outlet may be always accessible when the money handling apparatus faces a clerk side, and the shutter may be operated when the money handling apparatus faces a customer side.

Alternatively, forgotten money remaining in an outlet of money may not be taken into a housing when the money handling apparatus faces a clerk side, and forgotten money remaining in the outlet may be taken into the housing when the money handling apparatus faces a customer side.

Alternatively, a threshold value for determining whether money may be counterfeit based on a recognition result of money by a recognition unit is different between when the money handling apparatus faces a clerk side and when the money handling apparatus faces a customer side.

Alternatively, an upper limit value of the number of money to be dispensed may be different between when the money handling apparatus faces a clerk side and when the money handling apparatus faces a customer side.

DESCRIPTION OF THE PREFERRED EMBODIMENTS

Figure 1:
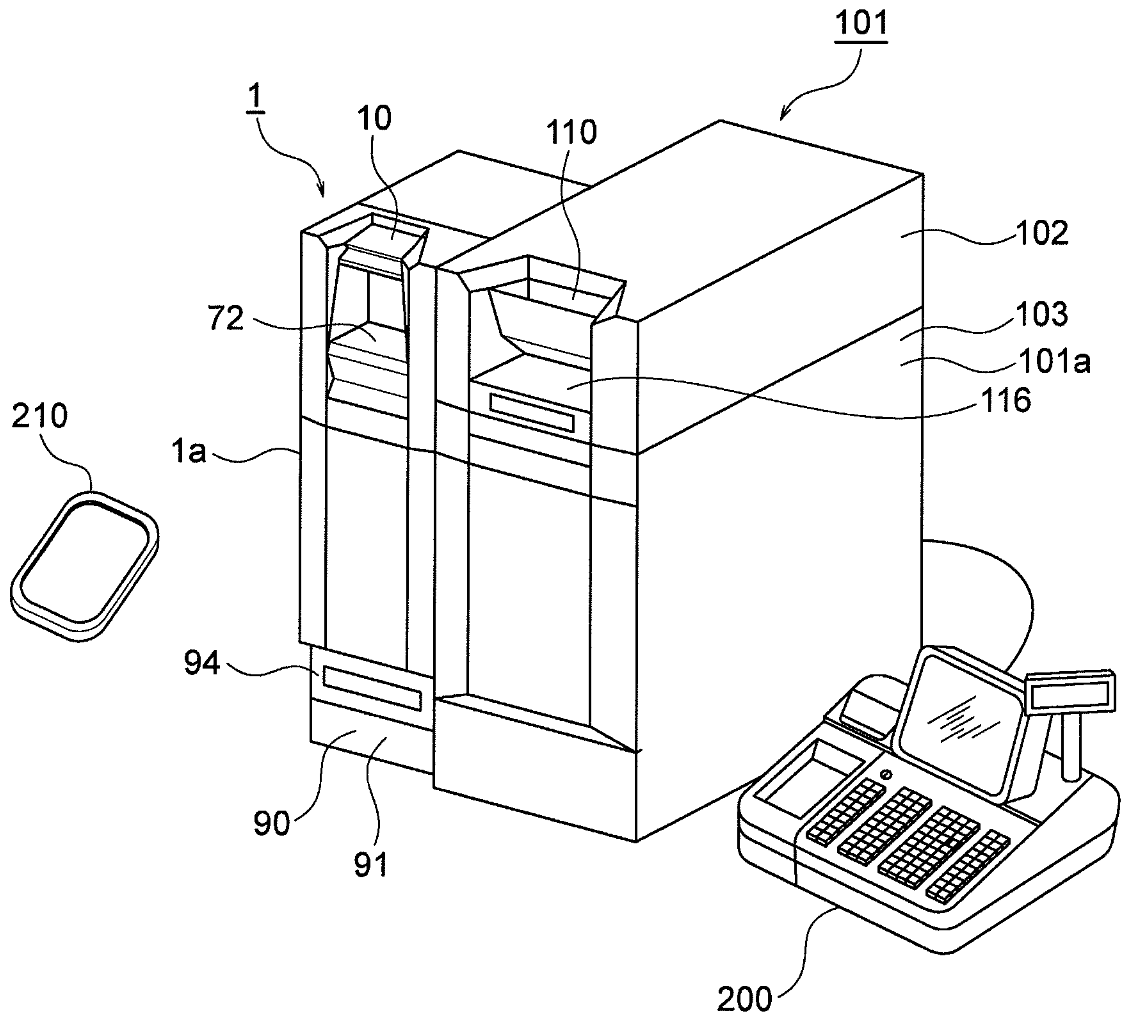
FIG. 1 is a perspective view showing an appearance of a money handling system according to an embodiment of the present invention.

Hereinafter, an embodiment of the present invention will be described with reference to the drawings. A money handling system according to the present embodiment is installed in stores such as supermarkets and convenience stores. The money handling system according to the present embodiment performs deposit processing of banknotes and coins as proceeds from sales and dispense processing of banknotes and coins as change. As shown in FIG. 1, the money handling system according to the present embodiment comprises a coin handling apparatus 1 and a banknote handling apparatus 101 arranged side by side. A POS register 200 is connected to the banknote handling apparatus 101 so as to be communicable via a LAN (local area network) or the like. The POS register 200 is used as a management apparatus for managing the coin handling apparatus 1 and the banknote handling apparatus 101. A checkout table (specifically, a table or counter) to separate a space into a clerk side and a customer side is disposed at a checkout station arranged in the store. The clerk waits on one side of the checkout table. In many cases, the POS register 200 is arranged on the side where the clerk waits so that the clerk can operate it. On the other hand, the customer stands on the other side of the checkout table and places items he or her wishes to purchase on the checkout table. The clerk registers identification numbers and/or prices of the items placed on the checkout table in the POS register 200. Also, the clerk receives money from the customer and puts it into the money handling system. It is noted that the side on which the clerk waits is defined as the clerk side, and the side on which the customer stands is defined as the customer side. In the money handling system according to the present embodiment, while an orientation of a front side of the banknote handling apparatus 101 is fixed to face the clerk side, it is possible to change an orientation of a front side of the coin handling apparatus 1 by 180° in a horizontal direction to face the customer side. In this way, when the orientation of the front side of the coin handling apparatus 1 in the horizontal direction is directed to face the customer side, the customer can deposit the coins into the coin handling apparatus 1 through the coin inlet 10 disposed on the front side surface of the coin handling apparatus 1. The orientation of the front side of the banknote handling apparatus 101 or the coin handling apparatus 1 is a perpendicular direction of the front side surface of the banknote handling apparatus 101 or the coin handling apparatus 1. Details of such a money handling system will be described below.

Figure 2:
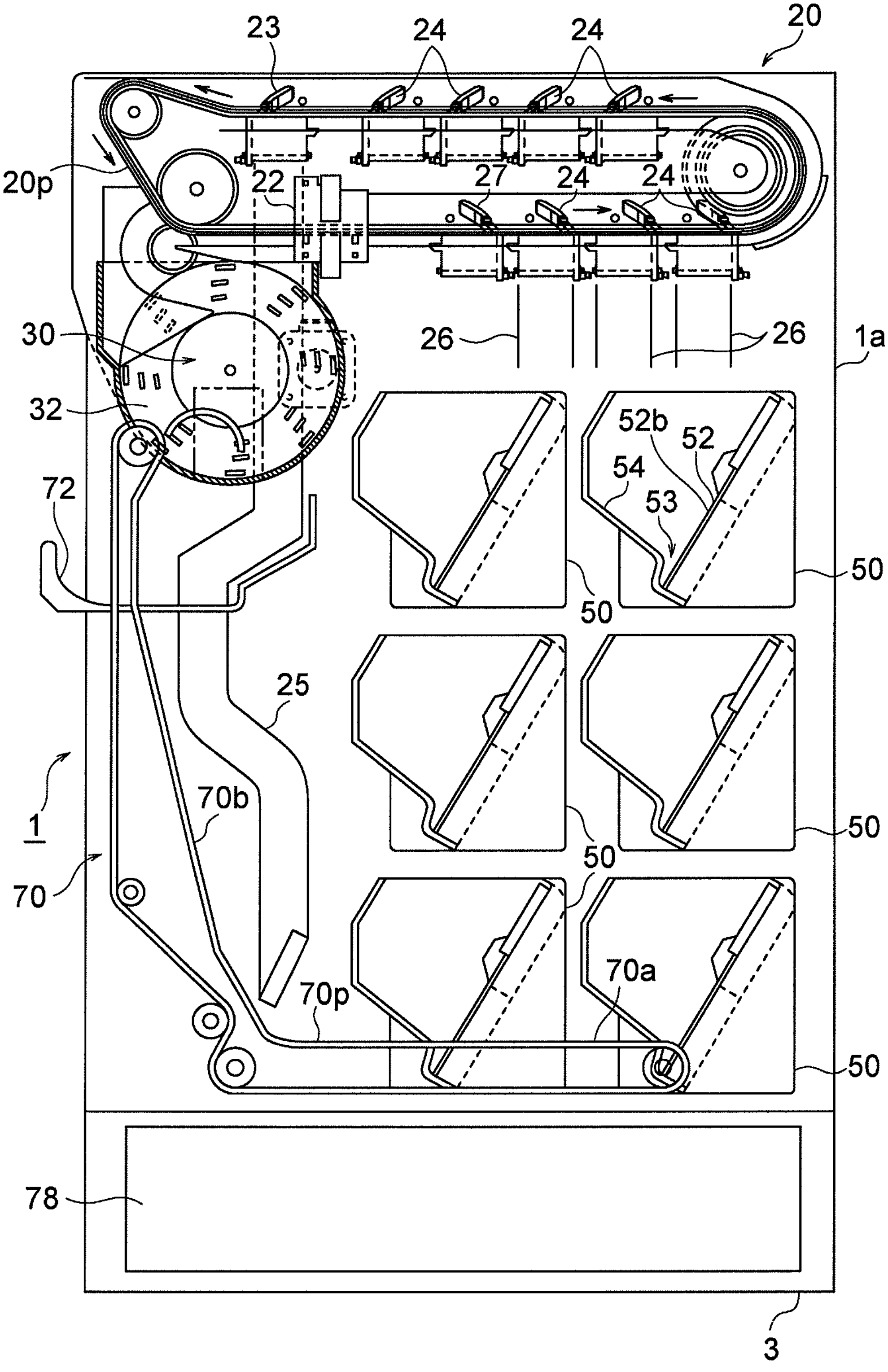
FIG. 2 is a side view showing an internal configuration of a coin handling apparatus in the money handling system shown in FIG. 1.
Figure 3:
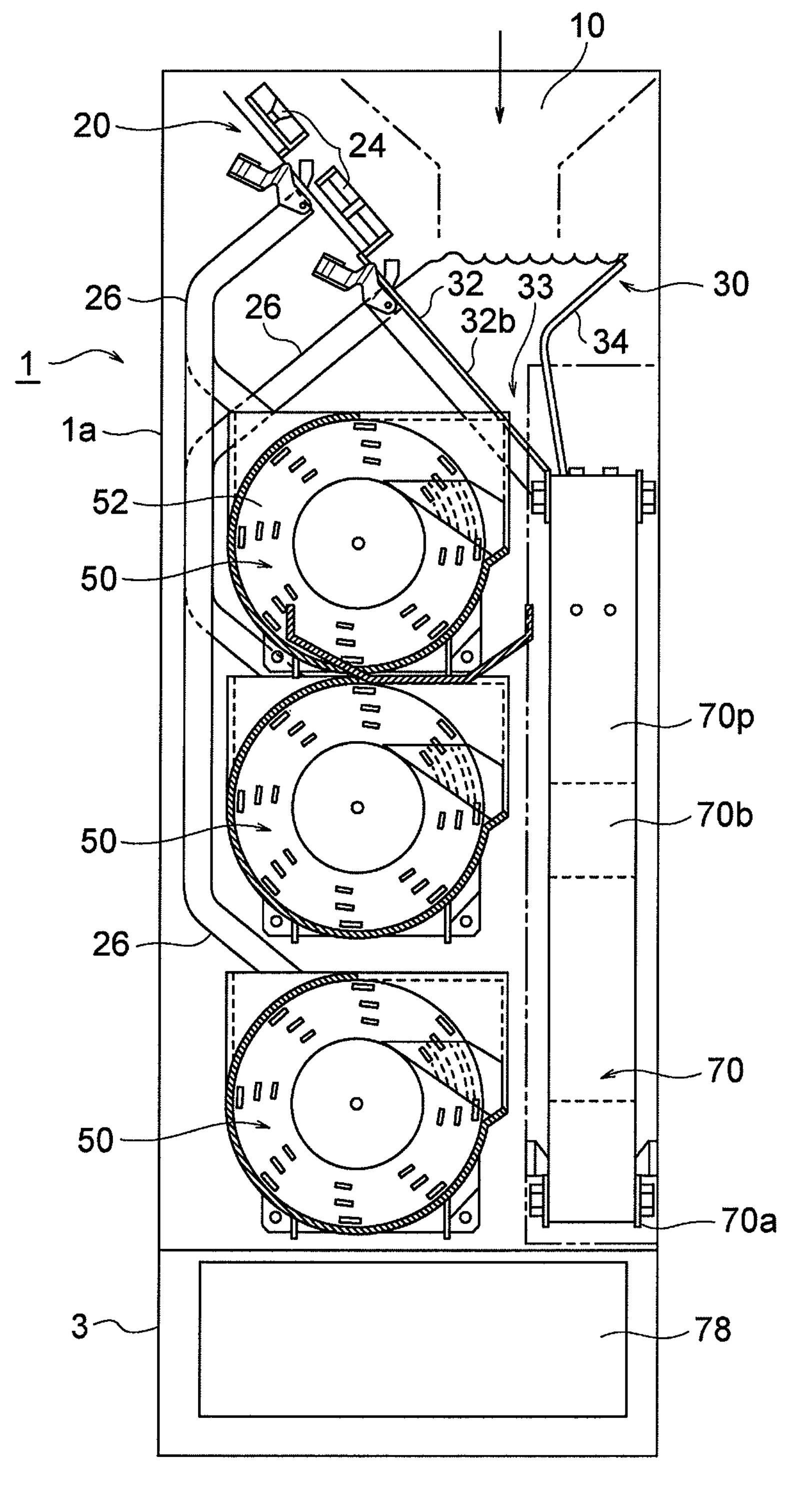
FIG. 3 is a front view showing the internal configuration of the coin handling apparatus in the money handling system shown in FIG. 1.

First, the configuration of the coin handling apparatus 1 will be described in detail with reference to FIGS. 2 and 3. A left side surface of a housing 1*a* (described later) in FIG. 2 is a front side of the coin handling apparatus 1 (that is, the front side when the coin handling apparatus 1 is seen from front as shown in FIG. 1). A right direction in FIG. 2 is a depth direction of the housing 1*a*. FIG. 3 is a front view showing an internal configuration of the coin handling apparatus 1 when the coin handling apparatus 1 is viewed from front as shown in FIG. 1.

As shown in FIGS. 2 and 3, the coin handling apparatus 1 includes the substantially rectangular parallelepiped housing 1*a*, a coin inlet 10 for feeding coins from the outside to the inside of the housing 1*a*, and a retaining/feeding unit 30. The coins fed into the housing 1*a* are sent to the retaining/feeding unit 30 and stored in the retaining/feeding unit 30. The retaining/feeding unit 30 feeds out the stored coins one by one. As shown in FIG. 3, the retaining/feeding unit 30 includes a rotating disk 32 that is inclined at a predetermined angle with respect to a vertical direction and rotated in an inclined posture, and a cover member 34 which forms a coin retaining space 33 for storing coins between the cover member 34 and a surface 32*b* of the rotating disk 32. In the present embodiment, the cover member 34 can be opened in the retaining/feeding unit 30. When the cover member 34 is opened, a foreign object such as a clip remaining in the retaining/feeding unit 30 falls from the retaining/feeding unit 30 by its own weight and is sent to a coin outlet 72 described later. A coin operation unit (not shown) disposed on a front side surface of the coin handling apparatus 1 comprises the coin inlet 10 and the coin outlet 72. As will be described later, in the case where a return unit (a reject unit) for returning a reject coin to the outside of the housing 1*a* is disposed in the vicinity of the coin outlet 72 separately from the coin outlet 72, when the cover member 34 is opened, the foreign object such as the clip fallen by its own weight from the retaining/feeding unit 30 may be sent to the return unit.

As shown in FIG. 2, a deposited coin transporting unit 20 for transporting the coins fed out from the retaining/feeding unit 30 one by one is disposed at an upper part in the housing 1*a*. The deposited coin transporting unit 20 is provided with a recognition unit 22. The recognition unit 22 recognizes the denomination, authenticity, fitness, new/old, front/back and transportation state of the coin transported by the deposited coin transporting unit 20.

As shown in FIG. 2, the deposited coin transporting unit 20 includes an endless belt 20*p*. The endless belt 20*p* is stretched over a plurality of pulleys. The endless belt 20*p* is circulated in a counterclockwise direction in FIG. 2 by a motor attached to one pulley. A plurality of projecting members (not shown) is disposed at equal intervals in the endless belt 20*p*. As one coin is hooked on one projecting member, the coins are transported one by one on a transportation surface.

As shown in FIG. 2, a plurality (specifically, six) of storage/feeding units 50 is disposed under the deposited coin transporting unit 20 in the housing 1*a*. The coins are sent from the deposited coin transporting unit 20 to the storage/feeding units 50 via chutes 26 by coin-to-be-stored sorters 24 disposed at the deposited coin transporting unit 20 based on recognition result of the coins by the recognition unit 22, and the coins are stored in the storage/feeding units 50. The deposited coin transporting unit 20 is provided with a reject coin sorter 27 which is a sorter for the reject coin. The coin determined to be counterfeit by the recognition unit 22 is sorted by the reject coin sorter 27 and then sent to the coin outlet 72 described later via a chute (not shown) for the reject coin. Although not shown, in addition to the coin outlet 72, a return unit (reject unit) for returning the reject coin to the outside of the housing 1*a* may be disposed near the coin outlet 72. In this case, the coin determined to be counterfeit by the recognition unit 22 is sorted by the reject coin sorter 27 as the reject coin and then sent to the return unit via the chute for the reject coin.

Each storage/feeding unit 50 feeds out the coins stored in the storage/feeding unit 50 one by one. More specifically, each storage/feeding unit 50 includes a rotating disk 52 which is inclined at a predetermined angle with respect to the vertical direction and is rotated in an inclined posture, and a cover member 54 which forms a coin storage space 53 for storing the coins between the cover member 54 and a surface 52*b* of the rotating disk 52.

As shown in FIGS. 1 and 2, in the coin handling apparatus 1 according to the present embodiment, the coin outlet 72 for feeding the coins to the outside of the housing 1*a* is disposed on the front surface of the housing 1*a*. The operator can put his or her hand into the coin outlet 72 from the front side of the housing 1*a* such that the operator can take out the coins stored inside the coin outlet 72 to the outside of the housing 1*a* by hand. The coin outlet 72 may be provided with a shutter (not shown) for opening or closing an outlet opening of the coins. A coin-to-be-dispensed transporting unit 70 is disposed in the housing 1*a* so as to extend laterally and downwardly of the storage/feeding units 50. The coin-to-be-dispensed transporting unit 70 transports the coins fed out from the storage/feeding units 50 to the coin outlet 72. The coin-to-be-dispensed transporting unit 70 includes a first coin-to-be-dispensed transporting portion 70*a* disposed under the storage/feeding units 50 and extending substantially in the horizontal direction, and a second coin-to-be-dispensed transporting portion 70*b* which transports the coins sent from the first coin-to-be-dispensed transporting portion 70*a* to the coin outlet 72. The coin-to-be-dispensed transporting unit 70 includes an endless belt 70*p* stretched over a plurality of pulleys. Specifically, one endless belt 70*p* is disposed so as to extend over the first coin-to-be-dispensed transporting portion 70*a* and the second coin-to-be-dispensed transporting portion 70*b*. By a motor attached to one pulley, the endless belt 70*p* is circulated in both clockwise and counterclockwise directions in FIG. 2. A plurality of projecting members (not shown) is disposed at equal intervals in the endless belt 70*p*. As one or more coins are hooked on one projecting member, one or more coins are transported by each projecting member of the endless belt 70*p*.

As shown in FIG. 2, a collecting box (collecting unit) 78 used as an overflow coin storage is disposed below the coin-to-be-dispensed transporting unit 70. The collecting box 78 can be pulled in a horizontal direction to the front side with respect to a collecting box storage 3 disposed below the housing 1*a*. By circulating the endless belt 70*p* in the clockwise direction in FIG. 2, the coins are sent from the first coin-to-be-dispensed transporting portion 70*a* of the coin-to-be-dispensed transporting unit 70 to the collecting box 78. Then, after the coins are stored in the collecting box 78, the coins stored in the collecting box 78 can be collected together with the collecting box 78 by pulling the collecting box 78 from the collecting box storage 3 to the front side.

As shown in FIG. 2, the coin handling apparatus 1 according to the present embodiment includes an overflow coin chute 25 for directly sending the coins to the coin-to-be-dispensed transporting unit 70 from the deposited coin transporting unit 20 without passing through the storage/feeding units 50. The deposited coin transporting unit 20 is provided with an overflow coin sorter 23 that sorts the coin to be sent to the overflow coin chute 25, apart from the coin-to-be-stored sorters 24 that sort the coin to be sent to each chute 26 corresponding to each storage/feeding unit 50. A lower end portion of the overflow coin chute 25 is located above the endless belt 70*p* of the coin-to-be-dispensed transporting unit 70. With such a configuration, the coin sorted by the overflow coin sorter 23 among the coins transported by the deposited coin transporting unit 20 is sent to the endless belt 70*p* of the coin-to-be-dispensed transporting unit 70 through the overflow coin chute 25.

By such an overflow coin chute 25, when the storage/feeding unit 50 corresponding to the denomination of the coin recognized by the recognition unit 22 is in a full state or a near full state, the coin of the denomination which is corresponding to the storage/feeding unit 50 in the full state or the near full state can be sorted by the overflow coin sorter 23 without stopping the transportation of the coins by the deposited coin transporting unit 20. Then, the sorted coin can be sent onto the endless belt 70*p* of the coin-to-be-dispensed transporting unit 70 by the overflow coin chute 25. The coin sent onto the endless belt 70*p* of the coin-to-be-dispensed transporting unit 70 by the overflow coin chute 25 is transported to the collecting box 78 by the endless belt 70*p*. In the coin handling apparatus 1 having such a configuration, even if the storage/feeding unit 50 corresponding to the denomination of the coin recognized by the recognition unit 22 is in the full state or the near full state, the coin can be sent to the collecting box 78 without stopping the transportation of the coins by the deposited coin transporting unit 20. Therefore, it is possible to prevent the coin processing speed from decreasing.

Figure 4:
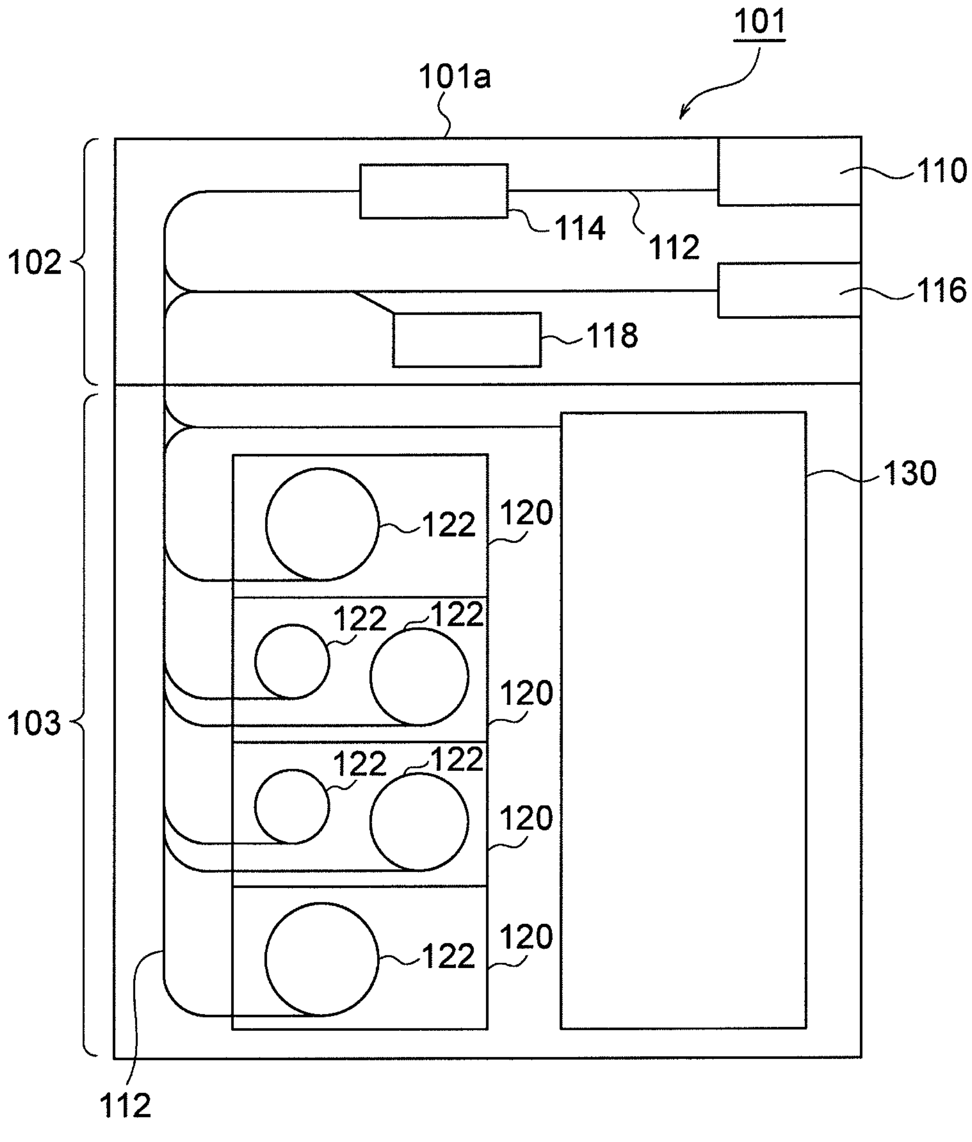
FIG. 4 is a side view showing an internal configuration of a banknote handling apparatus in the money handling system shown in FIG. 1.

Next, a configuration of the banknote handling apparatus 101 will be described in detail with reference to FIG. 4. A right side surface of a housing 101*a* (described later) in FIG. 4 is a front side of the banknote handling apparatus 101 (that is, the front side when the banknote handling apparatus 101 is seen from front as shown in FIG. 1). The left direction in FIG. 4 is the depth direction of the housing 101*a*.

As shown in FIG. 4, the banknote handling apparatus 101 includes the substantially rectangular parallelepiped housing 101*a*. The banknote handling apparatus 101 includes an upper assembly 102 and a lower assembly 103. The upper assembly 102 is provided with a banknote inlet 110 for feeding the banknotes from the outside to the inside of the housing 101*a*, a transporting unit 112 for transporting the banknotes fed into the housing 101*a* by the banknote inlet 110, a recognition unit 114 disposed at the transporting unit 112 for recognizing the banknotes transported by the transporting unit 112, and a banknote outlet 116 for feeding the banknotes from the inside to the outside of the housing 101*a*, respectively. A banknote operation unit (not shown) disposed on a front side surface of the banknote handling apparatus 101 comprises the banknote inlet 110 and the banknote outlet 116. A dispense reject unit 118 is connected to the transporting unit 112 in the upper assembly 102.

The banknote inlet 110 is provided with a plurality of rollers such as a feed roller and a kicker roller. The lowest banknote among the banknotes stacked on the banknote inlet 110 placed by the operator is kicked out one by one toward the feed roller by the kicker roller, and the kicked banknote is fed one by one into the inside of the housing 101*a* by the feed roller. The banknotes fed into the housing 101*a* by the banknote inlet 110 are transported one by one by the transporting unit 112. The recognition unit 114 recognizes the denomination, authenticity, fitness, new/old, front/back and transportation state of the banknote transported by the transporting unit 112. The banknote recognized by the recognition unit 114 is sent to each storage/feeding unit 120 described later by the transporting unit 112 for each denomination, for example. When dispensing process of the banknotes is performed in the banknote handling apparatus 101, among the banknotes fed out from the storage/feeding units 120 described later to the transporting unit 112, the banknotes other than the banknote to be fed to the outside of the housing 101*a* are sent to the dispense reject unit 118 and then stored in the dispense reject unit 118.

As shown in FIG. 4, the transporting unit 112 is disposed to extend over the upper assembly 102 and the lower assembly 103. The plurality of (four in the example shown in FIG. 4) storage/feeding units 120 is connected to the transporting unit 112 in the lower assembly 103. The banknotes sent from the transporting unit 112 to each storage/feeding unit 120 are stored in each storage/feeding unit 120. In addition, each storage/feeding unit 120 can feed out the stored banknotes one by one to the transporting unit 112. More specifically, each storage/feeding unit 120 includes one or more drums 122. The banknotes sent from the transporting unit 112 to the storage/feeding units 120 are wound around the drum 122 together with a pair of tapes one by one such that the banknote is sandwiched between the pair of tapes. When the drum 122 rotates in a direction opposite to a winding direction of the tapes, the tapes are unwound from the drum 122. As a result, the banknotes sandwiched between the pair of tapes are fed out one by one to the transporting unit 112. In the banknote handling apparatus 101 according to the present embodiment, instead of using the storage/feeding unit 120 of tape reel type as shown in FIG. 4, a storage/feeding unit of a stacker type may be used in which banknotes are stacked when stored.

A collecting unit 130 is connected to the transporting unit 112 in the lower assembly 103. The collecting unit 130 is used for collecting the banknotes stored in each storage/feeding unit 120. More specifically, a banknote storage bag (not shown) for storing the banknotes can be detachably attached to the collecting unit 130. The banknotes transported from each storage/feeding unit 120 to the collecting unit 130 by the transporting unit 112 are stored in the banknote storage bag. In addition, the banknote of the denomination which is not assigned to each storage/feeding unit 120, and the overflow banknote that can not be stored in the storage/feeding unit 120 corresponding to the denomination of the banknote as the storage/feeding unit 120 is in the full state, are stored in the banknote storage bag attached to the collecting unit 130. By taking out the banknote storage bag from the collecting unit 130, the banknotes are collected with the banknote storage bag from the banknote handling apparatus 101.

Figure 5:
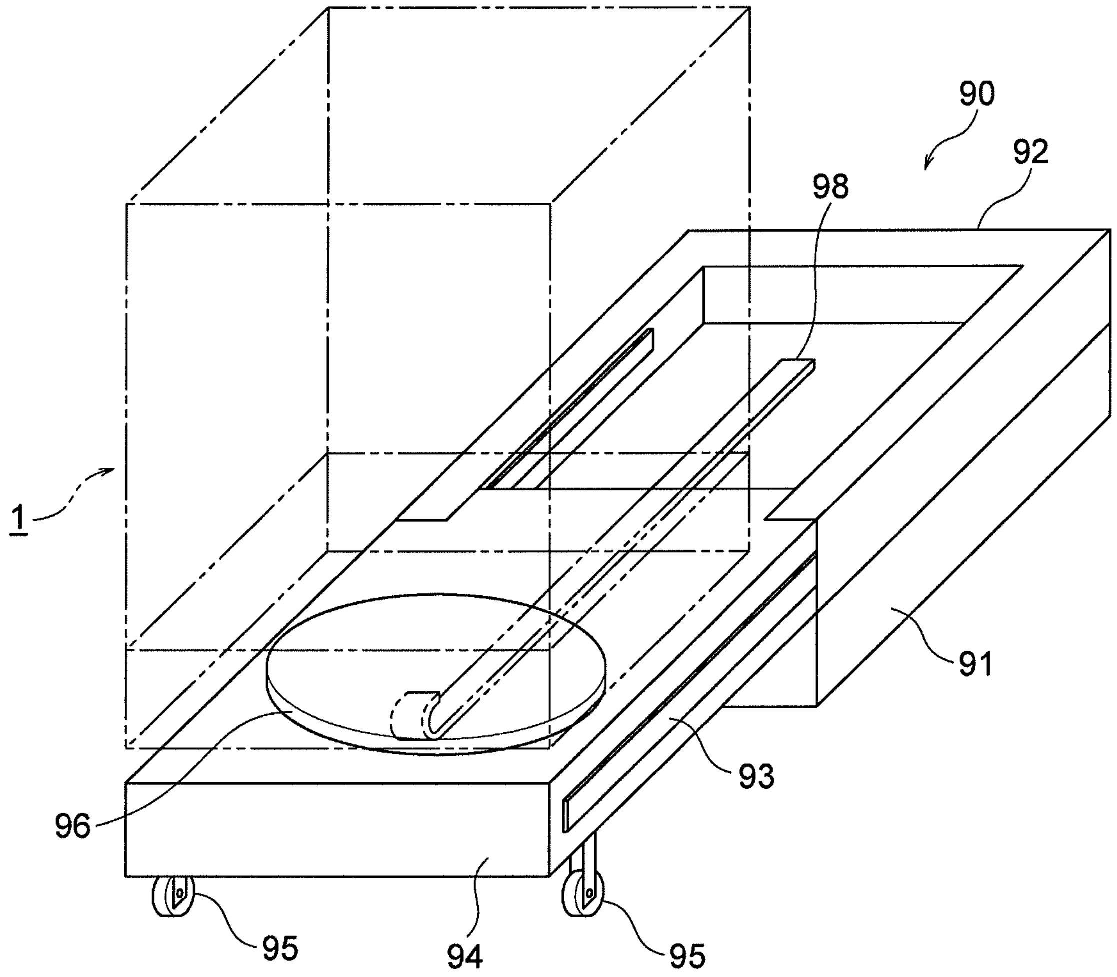
FIG. 5 is a perspective view showing a configuration of a stand on which the coin handling apparatus in the money handling system shown in FIG. 1 is placed.

As shown in FIG. 1, in the money handling system according to the present embodiment, the coin handling apparatus 1 is placed on a stand 90 and an orientation of the coin handling apparatus 1 placed on the stand 90 can be changed by 180° in the horizontal direction. Details of the structure of such a stand 90 will be described with reference to FIGS. 5 and 6. FIG. 5 is a perspective view showing a configuration of the stand 90 on which the coin handling apparatus 1 is placed, and FIG. 6 is a side view of the stand 90 shown in FIG. 5.

Figure 6:
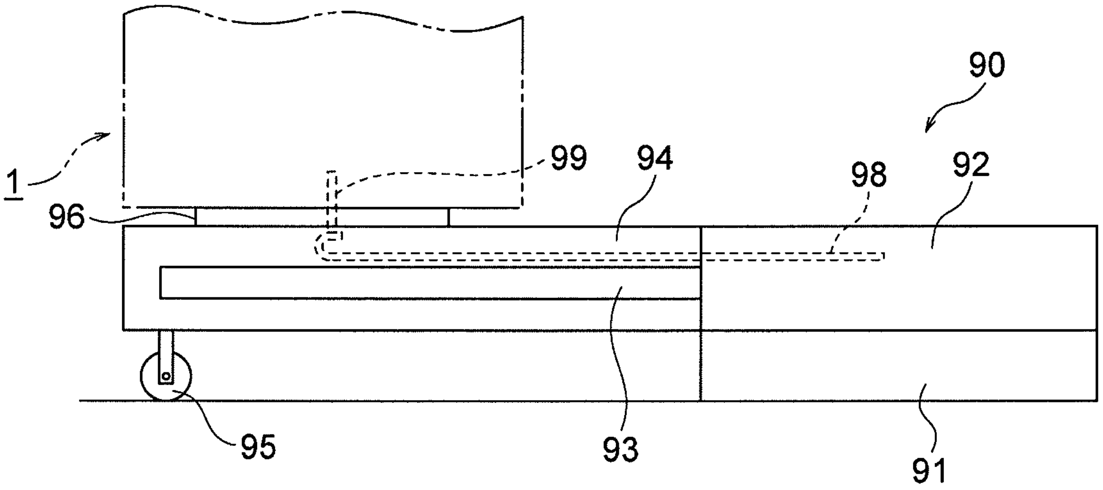
FIG. 6 is a side view of the stand shown in FIG. 5.

As shown in FIGS. 5 and 6, the stand 90 being a placing unit includes a base 91 disposed on the ground, for example, at a fixed position, a drawer 94 which can be pulled out to the front side in FIG. 5, a housing 92 which is disposed above the base 91 and houses the drawer 94, and a turntable 96 disposed on the upper surface of the drawer 94. The drawer 94 can move in the front side and the back side in FIG. 5 (that is, the left-right direction in FIG. 6). FIGS. 5 and 6 are drawings showing states when the drawer 94 is pulled out from the housing 92 to the front side. More specifically, guide rails 93 are disposed on both sides of the drawer 94.

Along the guide rails 93, the drawer 94 moves to the front side and the back side in FIG. 5. A pair of right and left casters 95 is disposed on the bottom surface on the near side of the drawer 94. Each caster 95 supports the front end portion of the drawer 94. The turntable 96 is rotatable on a horizontal plane around an axis extending in the vertical direction. The coin handling apparatus 1 (indicated by two-dot chain lines in FIGS. 5 and 6) is placed on the upper surface of the turntable 96. In the present embodiment, such a turntable 96 functions as a rotation mechanism that rotates the coin handling apparatus 1 around the axis extending in the vertical direction. Specifically, the turntable 96 as the rotation mechanism can change the orientation of the front side surface of the coin handling apparatus 1 by 180° in the horizontal direction. In the present embodiment, each guide rail 93, drawer 94 and each caster 95 function as a slide mechanism for sliding the coin handling apparatus 1 in the horizontal direction.

Furthermore, the money handling system according to the present embodiment has an orientation detector 152 (see FIG. 7) for detecting the orientation of the front side of the coin handling apparatus 1 with respect to the stand 90. Specifically, the orientation detector 152 detects the orientation of the front side of the coin handling apparatus 1 with respect to the stand 90 based on the rotational phase of the turntable 96. With such an orientation detector 152, it is possible to detect whether the front side of the coin handling apparatus 1 and the front side of the banknote handling apparatus 101 face in the same direction (that is, the orientation of the front side of the coin handling apparatus 1 is in the state shown in FIG. 1) or the front side of the coin handling apparatus 1 faces in the opposite directions to the front side of the banknote handling apparatus 101 (that is, the orientation of the front side of the coin handling apparatus 1 is in the state shown in FIG. 11 or FIG. 12).

As shown in FIGS. 5 and 6, a flexible linear runner flex 98 is disposed inside the drawer 94. A wiring for supplying power from the banknote handling apparatus 101 to the coin handling apparatus 1 and a signal line for transmitting and receiving a signal between the coin handling apparatus 1 and the banknote handling apparatus 101 are housed inside the runner flex 98. With such runner flex 98, it is possible to prevent the wiring and the signal line connecting the coin handling apparatus 1 and the banknote handling apparatus 101 from being broken even if the drawer 94 is pulled out from the housing 92. As shown in FIG. 6, there is provided a wiring storage case 99 in the center of the turntable 96. The wiring storage case 99 extends over the coin handling apparatus 1 and drawer 94 through the turntable 96. The wiring and the signal line connecting the coin handling apparatus 1 and the banknote handling apparatus 101 are housed in the wiring storage case 99. Thus, even when the turntable 96 rotates, it is possible to prevent the wiring and the signal line connecting the coin handling apparatus 1 and the banknote handling apparatus 101 from being broken.

In the money handling system according to the present embodiment, the height level of the upper surface of the coin handling apparatus 1 placed on the stand 90 is substantially the same as the height level of the banknote handling apparatus 101. Further, as shown in FIG. 1, the front side surface of the coin handling apparatus 1 and the front side surface of the banknote handling apparatus 101, at which the operation unit comprising the inlet and outlet is disposed each, are aligned when the front side of the coin handling apparatus 1 and the front side of the banknote handling apparatus 101 face in the same direction.

Figure 7:
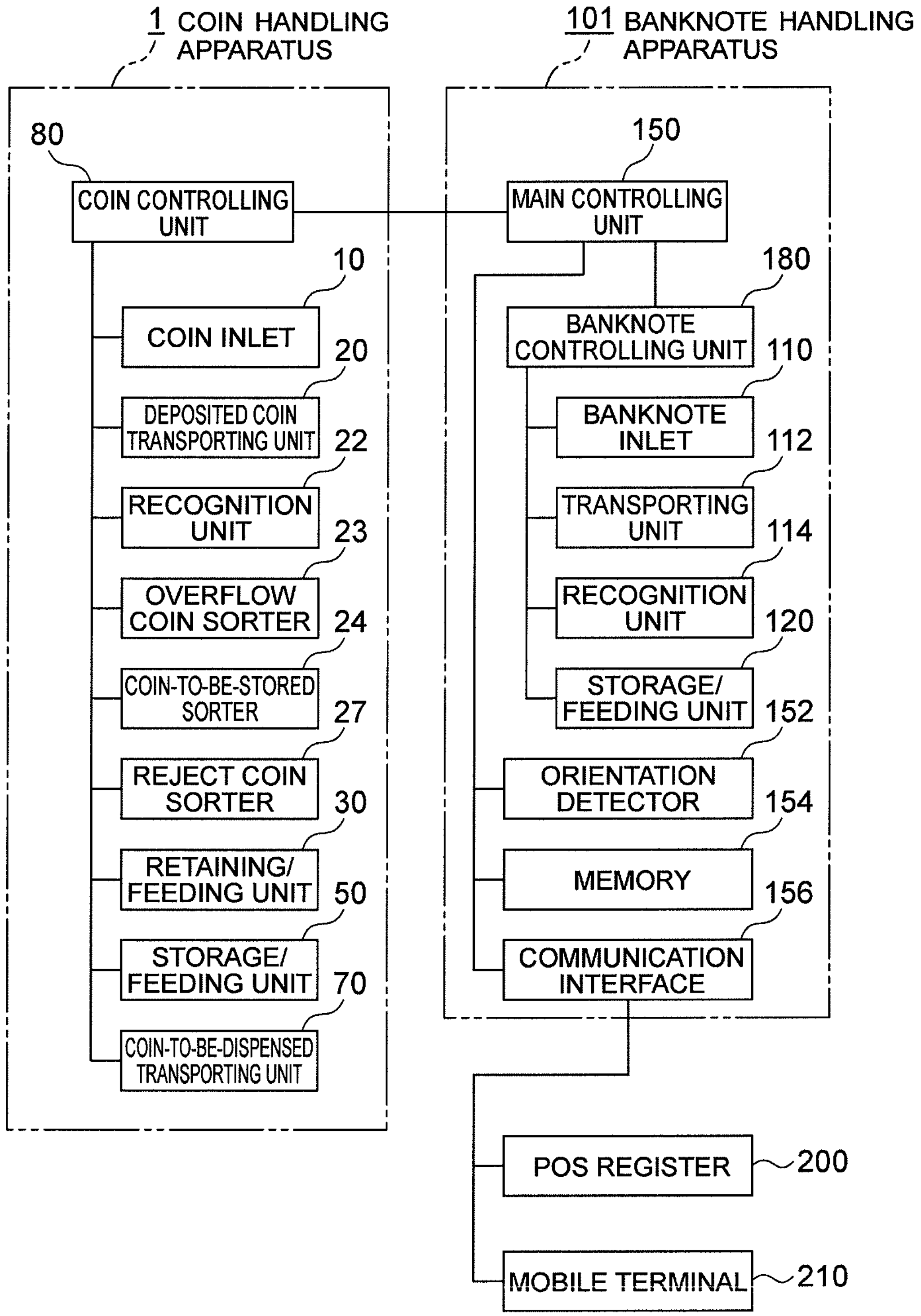
FIG. 7 is a functional block diagram showing a configuration of a control system of the money handling system shown in FIG. 1.

Next, the configuration of the control system of the money handling system according to the present embodiment will be described with reference to FIG. 7. As shown in FIG. 7, a coin controlling unit 80 for controlling the components of the coin handling apparatus 1 is disposed inside the housing 1*a* of the coin handling apparatus 1. Specifically, the components such as the coin inlet 10, the deposited coin transporting unit 20, the recognition unit 22, the overflow coin sorter 23, the coin-to-be-stored sorter 24, the reject coin sorter 27, the retaining/feeding unit 30, the storage/feeding unit 50, the coin-to-be-dispensed transportation unit 70 and the like are respectively connected to the coin controlling unit 80. A signal relating to the recognition result of the coin by the recognition unit 22 is sent to the coin controlling unit 80. Also, the coin controlling unit 80 controls the components such as the coin inlet 10, the deposited coin transporting unit 20, the overflow coin sorter 23, the coin-to-be-stored sorter 24, the reject coin sorter 27, the retaining/feeding unit 30, the storage/feeding unit 50, the coin-to-be-dispensed transporting unit 70 by sending a command signal to these components.

A banknote controlling unit 180 for controlling the components of the banknote handling apparatus 101 and a main controlling unit 150 connected to the coin controlling unit 80 and banknote controlling unit 180 are respectively disposed inside the housing 101*a* of the banknote handling apparatus 101. Specifically, the components such as the banknote inlet 110, the transporting unit 112, the recognition unit 114, and the storage/feeding units 120 are respectively connected to the banknote controlling unit 180. A signal relating to the recognition result of the banknote by the recognition unit 114 is sent to the banknote controlling unit 180. The banknote controlling unit 180 controls the components such as the banknote inlet 110, the transporting unit 112, and the storage/feeding units 120 by sending a command signal to these components. The coin controlling unit 80 and the main controlling unit 150 are connected by the signal line, and the banknote controlling unit 180 and the main controlling unit 150 are connected by the other signal line. As described above, the signal line connecting the coin controlling unit 80 and the main controlling unit 150 is housed in the runner flex 98 and the wiring storage case 99.

As shown in FIG. 7, the orientation detector 152, a memory 154, and a communication interface 156 are connected to the main controlling unit 150, respectively. As described above, the direction of the coin handling apparatus 1 with respect to the stand 90 is detected by the orientation detector 152. The detection result by the orientation detector 152 is sent to the main controlling unit 150. The processing result of the coins and banknotes in the coin handling apparatus 1 and banknote handling apparatus 101 are memorized in the memory 154. Further, information relating to the inventory of the coins and banknotes for each denomination stored in the storage/feeding units 120 of the coin handling apparatus 1 and the storage/feeding units 120 of the banknote handling apparatus 101 are memorized in the memory 154. The main controlling unit 150 transmits and receives signals to and from the coin handling apparatus 1 and an external device (specifically, for example, the POS register 200) disposed separately from the banknote handling apparatus 101 via the communication interface 156. In the money handling system according to the present embodiment, if a mobile terminal 210 such as a mobile phone, smartphone, iPad (registered trademark) or the like can be used, the main controlling unit 150 can transmit and receive signals to and from the mobile terminal 210 via the communication interface 156.

Next, with reference to FIG. 1 and FIGS. 8 to 12, the operation of changing the orientation of the coin handling apparatus 1 in the horizontal direction in the money handling system having such a configuration will be described.

FIG. 1 is a perspective view showing a state in which the front side of the coin handling apparatus 1 and the front side of the banknote handling apparatus 101 face in the same direction. More specifically, as described above, when the front side of the coin handling apparatus 1 and the front side of the banknote handling apparatus 101 face in the same direction, the front side surface of the coin handling apparatus 1 and the front side surface of the banknote handling apparatus 101, at which the operation unit comprising the inlet and outlet is disposed each, are aligned. In this way, when the front side of the coin handling apparatus 1 and the front side of the banknote handling apparatus 101 face in the same direction, the store clerk can perform processing of coins and banknotes respectively from the front side in FIG. 1 in the coin handling apparatus 1 and the banknote handling apparatus 101.

Figure 8:
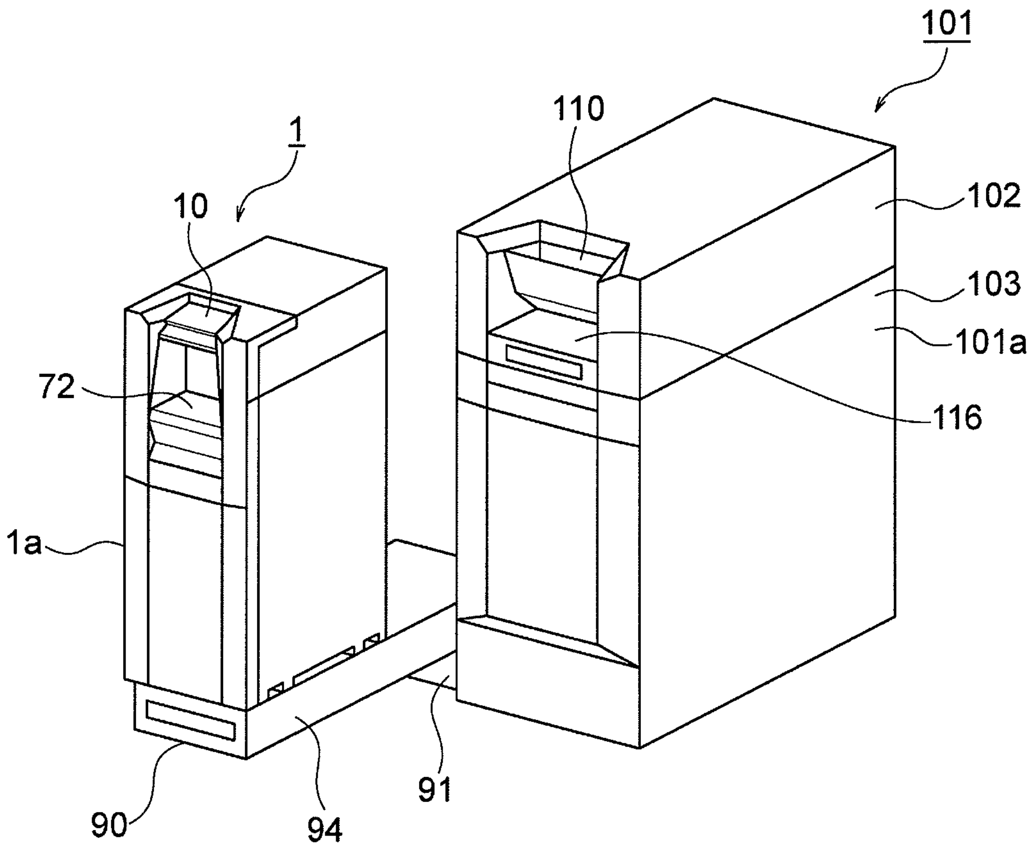
FIG. 8 is a perspective view showing an operation when changing an orientation of the coin handling apparatus in the money handling system shown in FIG. 1.
Figure 9:
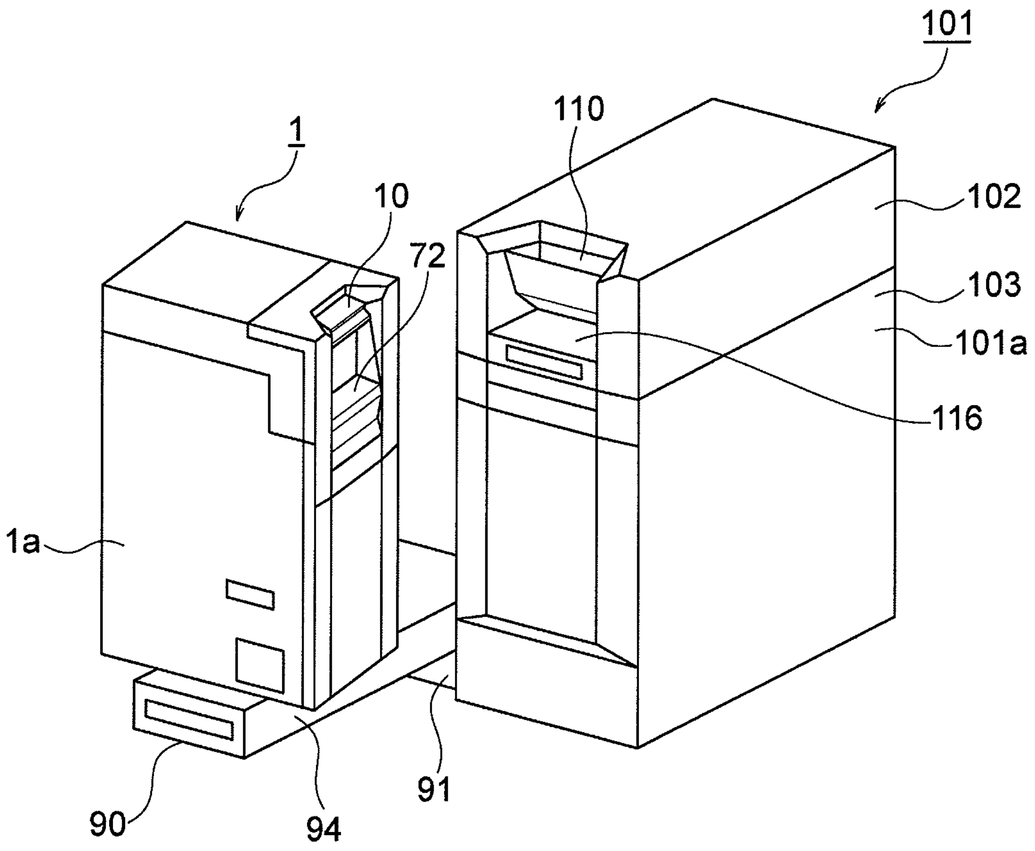
FIG. 9 is a perspective view showing the operation when changing the orientation of the coin handling apparatus in the money handling system shown in FIG. 1, following the state shown in FIG. 8.
Figure 10:
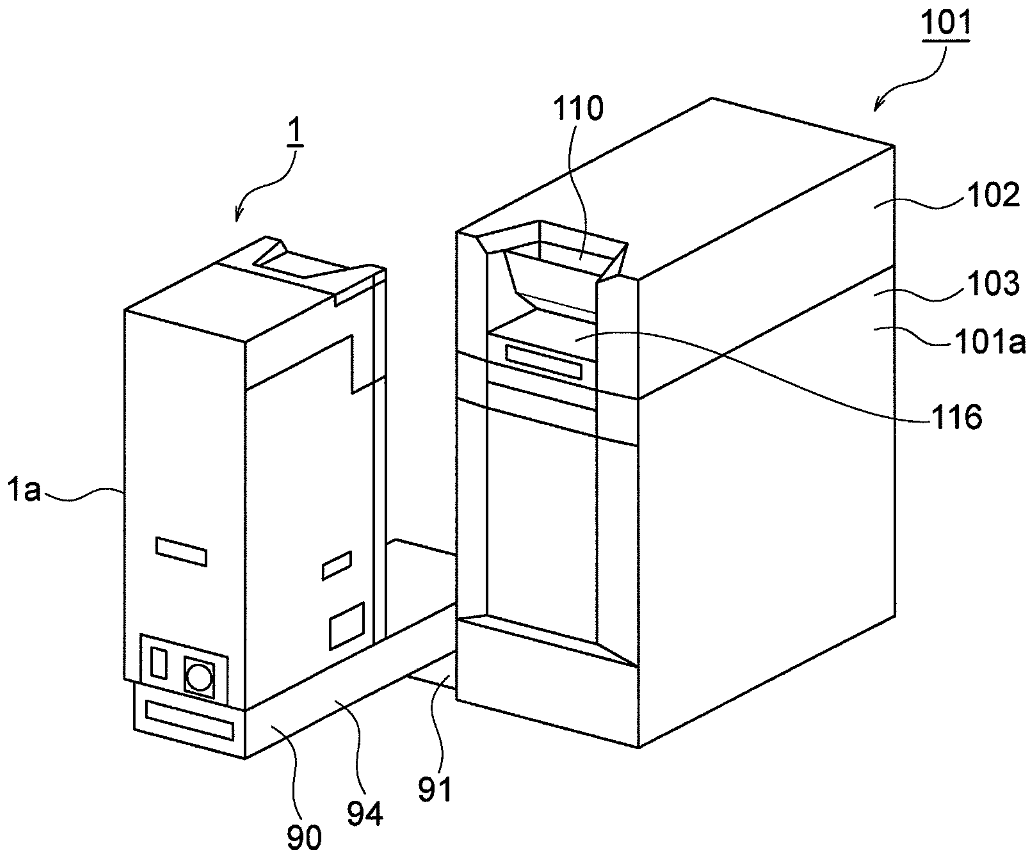
FIG. 10 is a perspective view showing the operation when changing the orientation of the coin handling apparatus in the money handling system shown in FIG. 1, following the state shown in FIG. 9.

In the store where the money handling system according to the present embodiment is installed, there is a desire to arrange only the front side of the coin handling apparatus 1 to face the customer side during the busy period such that the customer can handle the coins by the coin handling apparatus 1, while both the front side of the coin handling apparatus 1 and the front side of the banknote handling apparatus 101 are disposed to face the store clerk side in the usual period. In such a case, by changing the orientation of front side of the coin handling apparatus 1 by 180° in the horizontal direction, the customer can perform processing of the coins by the coin handling apparatus 1. Specifically, first, as shown in FIG. 8, the operator manually pulls the drawer 94 of the stand 90 from the housing 92 toward the operator such that the front side of the coin handling apparatus 1 placed on the drawer 94 is located on the nearer side of the operator than the front side of the banknote handling apparatus 101. Thereafter, as shown in FIGS. 9 and 10, the operator manually changes the orientation of the coin handling apparatus 1 from a first direction to a second direction being opposite to the first direction by 180° in the horizontal direction. More specifically, the turntable 96 is disposed on the upper surface of the drawer 94, and the turntable 96 is rotatable along the horizontal plane around the axis extending in the vertical direction. Further, the coin handling apparatus 1 is placed on the upper surface of the turntable 96. Therefore, when the turntable 96 is rotated by 180° around the axis extending in the vertical direction, the orientation of the coin handling apparatus 1 is changed by 180° in the horizontal direction.

Figure 11:
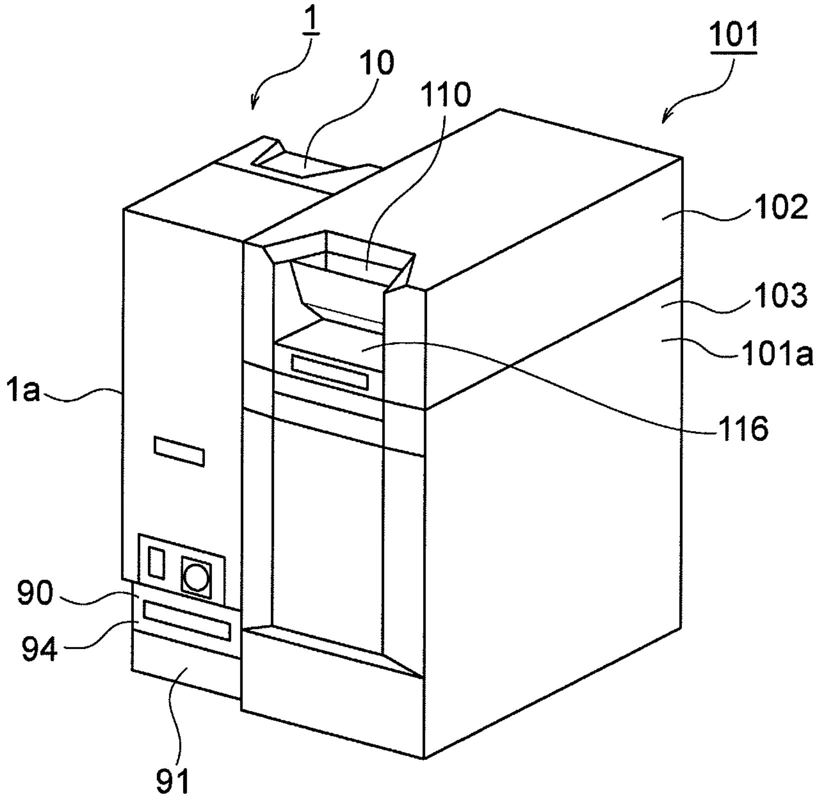
FIG. 11 is a perspective view showing the operation when changing the orientation of the coin handling apparatus in the money handling system shown in FIG. 1, following the state shown in FIG. 10.
Figure 12:
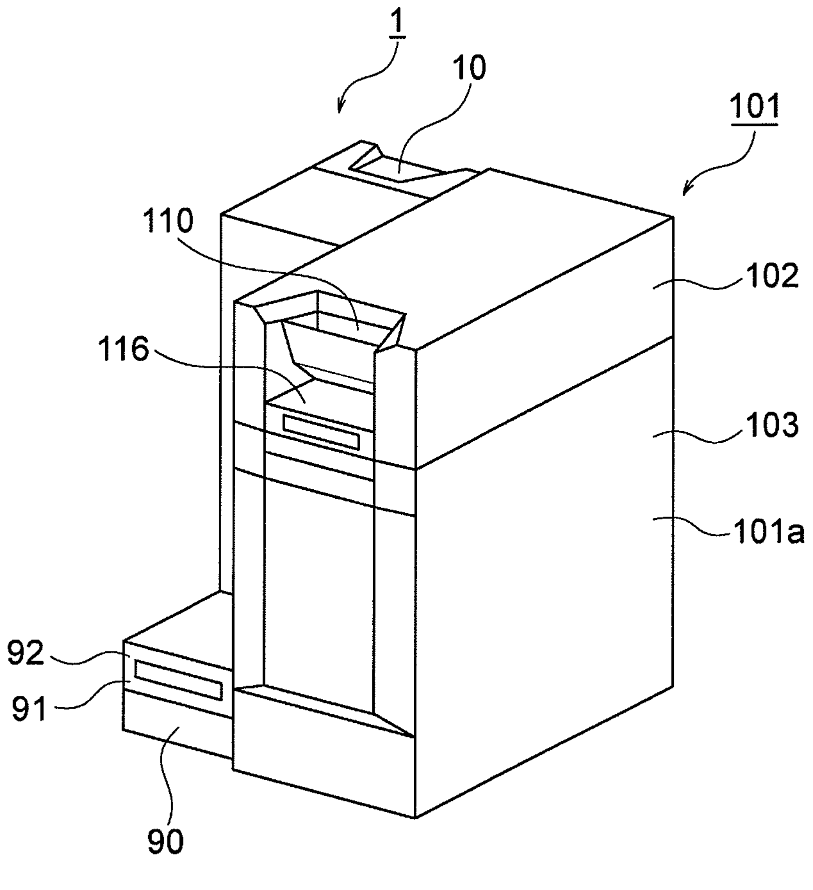
FIG. 12 is a perspective view showing the operation when changing the orientation of the coin handling apparatus in the money handling system shown in FIG. 1, following the state shown in FIG. 11.

Thereafter, as shown in FIG. 11, the operator manually pushes the drawer 94 of the stand 90 toward the base 91. As a result, the rear surface of the coin handling apparatus 1 (that is, the surface on the near side in FIG. 11) and the front surface of the banknote handling apparatus 101 are aligned. Thereafter, as shown in FIG. 12, the operator manually pushes the drawer 94 of the stand 90 further to the back side. As a result, the front surface of the coin handling apparatus 1 (that is, the surface on the back side in FIG. 11) and the back surface of the banknote handling apparatus 101 are aligned. In this case, the side surfaces of the coin handling apparatus 1 and the banknote handling apparatus 101 becomes aligned as seen from the customer side (that is, the rear side in FIG. 12) in which processing of the coins is performed in the coin handling apparatus 1. That is, when the coin handling apparatus 1 and the banknote handling apparatus 101 face in the opposite directions, the side surfaces on the customer side of the two coin handling apparatus 1 and banknote handling apparatus 101 are aligned. As a result, in the state of the coin handling apparatus 1 shown in FIG. 12, the customer can easily perform processing of the coins in the coin handling apparatus 1, compared to the situation where the coin handling apparatus 1 is located further back side than the banknote handling apparatus 101 as seen from the customer side as shown in FIG. 11.

Figure 13:
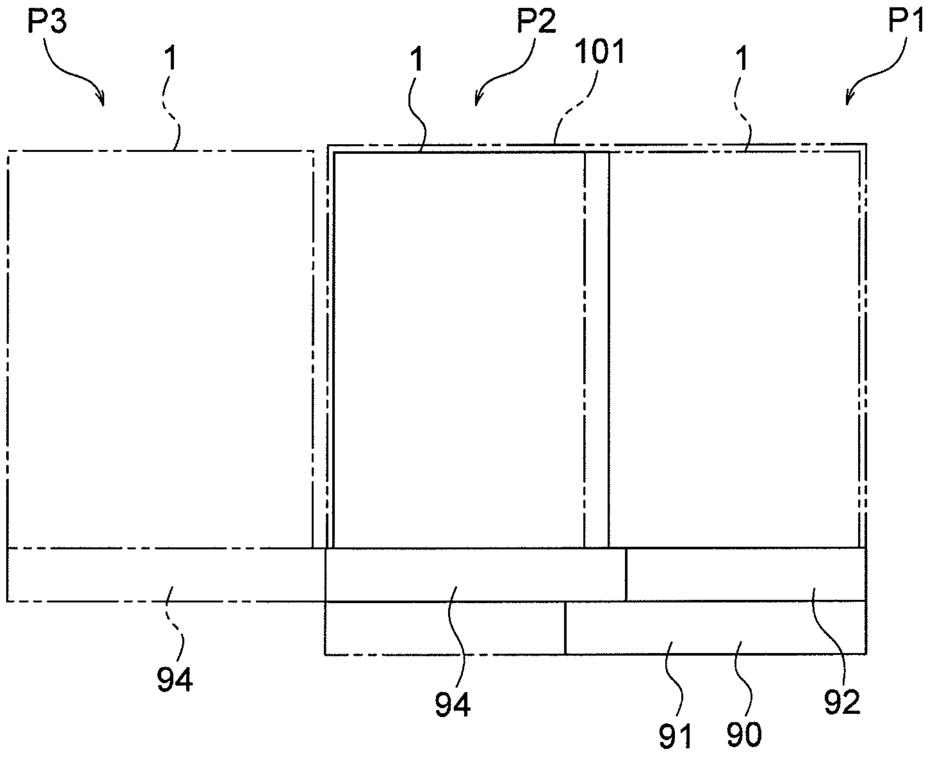
FIG. 13 is a side view showing three positions of the coin handling apparatus relative to the banknote handling apparatus in the money handling system shown in FIG. 1.

As described above, in the money handling system according to the present embodiment, the coin handling apparatus 1 slides by the slide mechanism (specifically, each guide rail 93, drawer 94 and each caster 95) between the three positions against the banknote handling apparatus 101. Three positions of the coin handling apparatus 1 against the banknote handling apparatus 101 will be described with reference to FIG. 13. In FIG. 13, the left side is the store clerk side and the right side is the customer side. As shown in FIG. 13, the coin handling apparatus 1 slides by the drawer 94 between a first position P1, a second position P2, and a third position P3. The first position P1 is a position where the side surfaces on the customer side of the coin handling apparatus 1 and banknote handling apparatus 101 are aligned when the coin handling apparatus 1 and banknote handling apparatus 101 face in the opposite directions. The second position P2 is a position where the front surfaces of the coin handling apparatus 1 and banknote handling apparatus 101 at which the operation unit comprising the inlet and outlet is disposed each, are aligned when the coin handling apparatus 1 and the banknote handling apparatus 101 face in the same direction. The third position P3 is a position where the orientation of the coin handling apparatus 1 in the horizontal direction can be changed by the turntable 96. When the coin handling apparatus 1 and the banknote handling apparatus 101 are in a state as shown in FIG. 12, the coin handling apparatus 1 is located at the first position P1 in FIG. 13. When the coin handling apparatus 1 and the banknote handling apparatus 101 are in the state as shown in FIG. 1, the coin handling apparatus 1 is located at the second position P2 in FIG. 13. When the coin handling apparatus 1 and the banknote handling apparatus 101 are in the state as shown in FIG. 8, the coin handling apparatus 1 is located at the third position P3 in FIG. 13. In this way, when the coin handling apparatus 1 slides between the three positions by each guide rail 93, drawer 94 and each caster 95 as the slide mechanism, the side surfaces of the coin handling apparatus 1 and the banknote handling apparatus 101 at the first position P1 and the second position P2 can be aligned on the customer side and on the store clerk side, respectively. Moreover, the horizontal orientation of the coin handling apparatus 1 can be changed by 180° without colliding with the banknote handling apparatus 101 at the third position P3.

In the money handling system according to the present embodiment, the orientation detector 152 detects the orientation of the coin handling apparatus 1 with respect to the stand 90, and information on the detection result is displayed on the monitor of the POS register 200 or the display screen of the mobile terminal 210. Specifically, as shown in FIG. 1, when the coin handling apparatus 1 faces the store clerk side, a message indicating that the clerk can perform processing of the coins and banknote in the coin handling apparatus 1 and banknote handling apparatus 101 is displayed on the monitor of the POS register 200 or the like. As shown in FIG. 12, when the coin handling apparatus 1 faces the customer side, a message indicating that the customer can perform processing of the coins in the coin handling apparatus 1 is displayed on the monitor of the POS register 200 or an external display device (not shown).

In the money handling system according to the present embodiment, processing of money is performed in different manners according to the orientation of the coin handling apparatus 1 with respect to the stand 90. Specifically, as shown in FIG. 1, when the front side of the coin handling apparatus 1 faces the store clerk side, replenishment processing of the coins and banknotes can be performed through the operation units of the coin handling apparatus 1 and banknote handling apparatus 101. It is noted that replenishment processing is a process of feeding the coins or banknotes as change into the housing 1$a$ or 101$a$ through the operation unit comprising the coin inlet 10 or banknote inlet 110 and storing them in the storage/feeding unit 50 or 120. However, as shown in FIG. 12, when the front side of the coin handling apparatus 1 faces the customer side, it is impossible to perform replenishment processing of the coins through the operation unit of the coin handling apparatus 1. As described above, if the front side of the coin handling apparatus 1 faces the customer side, the coins are fed into the coin handling apparatus 1 through the operation unit of the coin handling apparatus 1 by the customer when depositing process of the coins is performed. At this time, it is possible to prevent that the coins fed into the coin handling apparatus 1 for depositing process are erroneously processed as the coins for replenishment processing. More specifically, based on the orientation of front side of the coin handling apparatus 1 with respect to the stand 90 detected by the orientation detector 152, the main controlling unit 150 determines whether replenishment processing of the coins and banknotes can be performed in the coin handling apparatus 1, and then information on such determination result by the main controlling unit 150 is sent to the coin controlling unit 80. Then, the coin controlling unit 80 selectively prohibits replenishment processing of the coins in the coin handling apparatus 1 by controlling the components of the coin handling apparatus 1 based on the determination result by the main controlling unit 150.

In the present embodiment, when the front of the coin handling apparatus 1 faces the store clerk side as shown in FIG. 1, the collecting box 78 cannot be used as the overflow coin storage for storing the overflow coin in the coin handling apparatus 1. However, when the coin handling apparatus 1 faces the customer side as shown in FIG. 12, the collecting box 78 can be used as the overflow coin storage in the coin handling apparatus 1. More specifically, the main controlling unit 150 determines whether or not the overflow coin can be sent to the collecting box 78 based on the orientation of the coin handling apparatus 1 with respect to the stand 90 detected by the orientation detector 152, and then information related to the determination result by the main controlling unit 150 as described above is sent to the coin controlling unit 80. The coin controlling unit 80 selectively prohibits the overflow coin from being sent to the collecting box 78 in the coin handling apparatus 1 by controlling the components of the coin handling apparatus 1 based on the determination result by the main controlling unit 150. Specifically, as shown in FIG. 1, when the orientation detector 152 detects that the coin handling apparatus 1 faces the store clerk side, the endless belt 70$p$ of the coin-to-be-dispensed transporting unit 70 circulates only in the counterclockwise direction in FIG. 2. As a result, the coins are not sent from the coin-to-be-dispensed transporting unit 70 to the collecting box 78. When deposit processing of the coins is performed in the coin handling apparatus 1 by the customer, if the overflow coin which can not be stored in the storage/feeding units 50 exists, it is necessary to send the overflow coin to the collecting box 78 so as not to interrupt the deposit processing of the coins. On the other hand, when deposit processing or replenishment processing of the coins is performed in the coin handling apparatus 1 by the store clerk, if the overflow coin which can not be stored in the storage/feeding units 50 exists, deposit processing or replenishment processing of the coins is interrupted and the clerk manages the coins that can not be deposited or replenished by hand. Then, as the coins are fed out from the storage/feeding unit 50 which is in the full state or the near full state and ejected to the outside of the housing 1$a$, collection processing of the coins or dispense processing of the change is performed. Then, after an empty area is formed in the storage/feeding unit 50 corresponding to the denomination of the coin determined to be the overflow coin, by resuming the deposit processing or replenishment processing of the coins which have been managed by the clerk by hand, the coins can be stored in the storage/feeding unit 50.

In the present embodiment, when the front side of the coin handling apparatus 1 faces the store clerk side as shown in FIG. 1, unless an instruction to start deposit processing of money is accepted, deposit processing of the coins cannot be started in the coin handling apparatus 1. However, when the front side of the coin handling apparatus 1 faces the customer side as shown in FIG. 12, if it is detected that the coins are put into the coin inlet 10, deposit processing of the coins can be started in the coin handling apparatus 1. More specifically, the main controlling unit 150 determines whether or not the deposit processing of the coins can be started when the coins are put into the coin inlet 10 in the coin handling apparatus 1, based on the orientation of the coin handling apparatus 1 with respect to the stand 90 detected by the orientation detector 152, and then information on such determination result by the main controlling unit 150 is sent to the coin controlling unit 80. The coin controlling unit 80 controls the components of the coin handling apparatus 1 based on the determination result by the main controlling unit 150 such that deposit processing of the coins is started when the coins are put into the coin inlet 10 in the coin handling apparatus 1 or deposit processing of the coins is started if the instruction to start deposit processing of money is accepted in the coin handling apparatus 1. When deposit processing of the coins is performed in the coin handling apparatus 1 by the customer, it is desirable to allow deposit processing of the coins to be started just by putting the coins into the coin inlet 10 even if the instruction to start deposit processing of money is not inputted, in order to improve the convenience for the customer. On the other hand, when deposit processing or replenishment processing of the coins is performed in the coin handling apparatus 1 by the store clerk, it is desirable to be able to start deposit processing of the coins in the coin handling apparatus 1 on condition that the instruction to start deposit processing of money is accepted. By doing this operation, it is possible to prevent the deposit processing of the coins from being performed when the coin is accidentally put into the coin inlet 10. Further, it is possible to clearly distinguish between deposit processing and replenishment processing of the coins.

In the present embodiment, one storage/feeding unit 50 among the plurality of storage/feeding units 50 in the coin handling apparatus 1 may be used as a counterfeit coin storage for storing a counterfeit coin. If such operation is conducted in the coin handling apparatus 1, when the coin handling apparatus 1 faces the store clerk side as shown in FIG. 1, the counterfeit coin put into the housing 1$a$ can be sent to a place other than the counterfeit coin storage (for example, the coin outlet 72 or collecting box 78). However, when the coin handling apparatus 1 faces the customer side as shown in FIG. 12, the counterfeit coin put into the housing 1*a* may be sent only to the counterfeit coin storage. More specifically, the main controlling unit 150 determines the destination of the counterfeit coin based on the orientation of the coin handling apparatus 1 with respect to the stand 90 detected by the orientation detector 152, and then information on such determination result by the main controlling unit 150 is sent to the coin controlling unit 80. The coin controlling unit 80 controls the components of the coin handling apparatus 1 based on the determination result by the main controlling unit 150, such that the counterfeit coin is sent to the counterfeit coin storage or the counterfeit coin is sent to a place other than the counterfeit coin storage (for example, the coin outlet 72 or collecting box 78) in the coin handling apparatus 1. When deposit processing of the coins is performed in the coin handling apparatus 1 by the customer, the counterfeit coin put into the housing 1*a* is sent only to the counterfeit coin storage, since it is necessary to store the counterfeit coin put into the housing 1*a* separately from the true coin inside the housing 1*a* of the coin handling apparatus 1 without dispensing it to the outside of the housing 1*a*. On the other hand, if deposit processing or replenishment processing of the coins is performed in the coin handling apparatus 1 by the store clerk, when the counterfeit coin is put into the housing 1*a*, the counterfeit coin is sent to the coin outlet 72 without sending it to the counterfeit coin storage. By this way, the store clerk can collect and manage the counterfeit coin. If it is not necessary to manage the counterfeit coin by the store clerk, the counterfeit coin is sent to the collecting box 78. With this, it is possible not to dispense the counterfeit coin as change.

In the present embodiment, if the shutter (not shown) for opening and closing the outlet opening of the coins is disposed at the coin outlet 72 of the coin handling apparatus 1, when the coin handling apparatus 1 faces the store clerk side as shown in FIG. 1, the shutter is not operated to close the outlet opening and the coin outlet 72 is always accessible. However, when the coin handling apparatus 1 faces the customer side as shown in FIG. 12, the shutter may be operated to close the outlet opening. More specifically, the main controlling unit 150 determines whether or not to operate the shutter for opening and closing the outlet opening of the coins disposed at the coin outlet 72 based on the orientation of the coin handling apparatus 1 with respect to the stand 90 detected by the orientation detector 152, and then information on such determination result by the main controlling unit 150 is sent to the coin controlling unit 80. The coin controlling unit 80 controls the components of the coin handling apparatus 1 based on the determination result by the main controlling unit 150, such that the shutter for opening and closing the outlet opening of the coins disposed at the coin outlet 72 is selectively operated. When dispense processing of the coins is performed in the coin handling apparatus 1 by the customer, if the customer forgets to take out the coins from the coin outlet 72, by operating the shutter to close the outlet opening of the coins at the coin outlet 72, for example, it is possible to prevent the other customer from accidentally taking out the coins from the coin outlet 72. On the other hand, when dispense processing of the coins is performed in the coin handling apparatus 1 by the store clerk, there is no particular inconvenience without operating the shutter for opening and closing the coin outlet in the coin outlet 72. Therefore, by not operating the shutter, it is possible to simplify processing of the coins for the store clerk.

In the present embodiment, a take-in mechanism (not shown) may be disposed at the coin outlet 72 for taking in a forgotten coin remaining in the coin outlet 72 of the coin handling apparatus 1 inside the housing 1*a*. If such take-in mechanism is disposed at the coin outlet 72 in the coin handling apparatus 1, when the coin handling apparatus 1 faces the store clerk side as shown in FIG. 1, the forgotten coin remaining in the coin outlet 72 is not taken into the housing 1*a* by the take-in mechanism. However, when the coin handling apparatus 1 faces the customer side as shown in FIG. 12, the forgotten coin remaining in the coin outlet 72 may be taken into the housing 1*a* by the take-in mechanism. More specifically, the main controlling unit 150 determines whether or not to use the take-in mechanism disposed at the coin outlet 72 based on the orientation of the coin handling apparatus 1 with respect to the stand 90 detected by the orientation detector 152, and then information on such determination result by the main controlling unit 150 is sent to the coin controlling unit 80. The coin controlling unit 80 controls the components of the coin handling apparatus 1 based on the determination result by the main controlling unit 150, such that the take-in mechanism is selectively operated. When dispense processing of the coins is performed in the coin handling apparatus 1 by the customer, if the customer forgets to take out the coins from the coin outlet 72, the forgotten coin remaining in the coin outlet 72 can be taken into the housing 1*a* by the take-in mechanism. This prevents the other customer from accidentally taking out the coins from the coin outlet 72. On the other hand, when dispense processing of the coins is performed in the coin handling apparatus 1 by the store clerk, there is no particular inconvenience even if the forgotten coin is not taken inside the housing 1*a* by the take-in mechanism, since the forgotten coin remaining in the coin outlet 72 will not be accidentally taken out by the other customer. Therefore, by not operating the take-in mechanism, it is possible to simplify processing of the coins for the store clerk.

In the present embodiment, a threshold value for determining whether the coin is counterfeit based on the recognition result of the coin by the recognition unit 22 is different between when the coin handling apparatus 1 faces the store clerk side as shown in FIG. 1 and when the coin handling apparatus 1 faces the customer side as shown in FIG. 12. Specifically, the threshold value when the main controlling unit 150 determines whether or not the coin is counterfeit in the case where deposit processing of the coins is performed in the coin handling apparatus 1 by the customer is set to a stricter value, compared with the threshold value when the main setting unit 150 determines whether or not the coin is counterfeit in the case where deposit processing of the coins is performed in the coin handling apparatus 1 by the store clerk. This makes it possible to more reliably detect the counterfeit coin when the customer puts the counterfeit coin into the coin inlet 10 when deposit processing of the coins is performed in the coin handling apparatus 1. On the other hand, when deposit processing of the coins is performed in the coin handling apparatus 1 by the store clerk, the store clerk visually checks the authenticity of the coin. As a result, it is considered that the counterfeit coin is unlikely to be put into the coin inlet 10 as a coin to be used as change. Therefore, in the case where deposit processing of the coins is performed in the coin handling apparatus 1 by the store clerk, there is no particular inconvenience even if lowering the threshold value when the main controlling unit 150 determines whether it is the counterfeit coin or not.

In the present embodiment, an upper limit value of the number of coins to be dispensed is different between when the coin handling apparatus 1 faces the store clerk side as shown in FIG. 1, and when the coin handling apparatus 1 faces the customer side as shown in FIG. 12. When dispense processing of the coins is performed in the coin handling apparatus 1 by the customer, by setting the upper limit value of the number of coins that can be dispensed to a predetermined value, it is possible to prevent unlimited dispensing of the coins. On the other hand, if dispense processing of the coins is performed in the coin handling apparatus 1 by the store clerk, it is desirable not to set the upper limit value of the number of coins that can be dispensed, so that the coins can be dispensed indefinitely. When collection processing of the coins is performed in the coin handling apparatus 1 by the store clerk, for example, all the coins are fed out from the storage/feeding units 50 and sent to the coin outlet 72 or the collecting box 78. Therefore, if the upper limit value of the number of coins that can be dispensed is set, there is a fear that all the coins stored in the storage/feeding units 50 can not be collected.

According to the money handling system of the present embodiment having the above-described configuration, the placing unit (more specifically, the stand 90) on which the money handling apparatus (more specifically, the coin handling apparatus 1) is placed is provided with the orientation change mechanism for changing the orientation of the money handling apparatus in the horizontal direction. In this case, it is possible to easily change the orientation of the money handling apparatus in the horizontal direction. More specifically, in the conventional money handling system, it is not easy to frequently change the orientation of the money handling apparatus because the weight of the money handling apparatus (specifically, the coin handling apparatus) is large. Especially, when arranging a plurality of money handling apparatuses side by side or arranging the money handling apparatus next to other equipment or wall, it is difficult to change the orientation of the money handling apparatus, because other adjacent money handling apparatus or equipment is obstacle. On the other hand, in the money handling system according to the present embodiment, by arranging the orientation change mechanism for changing the orientation of the money handling apparatus in the horizontal direction to the stand 90 on which the money handling apparatus is placed, it is possible to easily change the orientation of the money handling apparatus in the horizontal direction.

In the money handling system according to the present embodiment, as described above, the orientation detector 152 for detecting the orientation of the money handling apparatus (more specifically, the coin handling apparatus 1) with respect to the stand 90 is disposed. In this case, the orientation of the money handling apparatus with respect to the stand 90 is automatically recognized by the main controlling unit 150 or the like.

In the money handling system according to the present embodiment, as described above, the orientation change mechanism includes the rotation mechanism (specifically, the turntable 96) for rotating the money handling apparatus (specifically, the coin handling apparatus 1) around the axis extending in the vertical direction. In this case, by rotating the turntable 96 around the axis extending in the vertical direction, it is possible to easily change the orientation of the money handling apparatus in the horizontal direction. Further, in this case, the rotation mechanism composed of the turntable 96 or the like can change the orientation of the money handling apparatus in the horizontal direction by 180°.

In the money handling system according to the present embodiment, as described above, the stand 90 is provided with the slide mechanism (more specifically, each guide rail 93, drawer 94 and each caster 95) for sliding the money handling apparatus (more specifically, the coin handling apparatus 1) in the horizontal direction. In this case, it is possible to prevent collision with the other money handling apparatus (specifically, the banknote handling apparatus 101) arranged in parallel when turning the money handling apparatus, by sliding the money handling apparatus away from the other money handling apparatus before rotating the money handling apparatus.

In the money handling system according to the present embodiment, as described above, the two money handling apparatuses (specifically, the coin handling apparatus 1 and the banknote handling apparatus 101) are arranged adjacent to each other. In addition, at least one money handling apparatus (specifically, the coin handling apparatus 1) is placed on the stand 90 provided with the orientation change mechanism. In this case, while both the coin handling apparatus 1 and the banknote handling apparatus 101 are placed to face the store clerk side in the usual time period, it becomes possible to arrange only one money handling apparatus (more specifically, the coin handling apparatus 1) to face the customer side only during the busy period.

In the money handling system according to the present embodiment, as described above, the height levels of the upper surfaces of the money handling apparatuses are approximately the same. That is, the height level of the upper surface of the coin handling apparatus 1 placed on the stand 90 is substantially the same as the height level of the upper surface of the banknote handling apparatus 101. In this case, the appearance of the money handling system composed of the coin handling apparatus 1 and the banknote handling apparatus 101 is improved.

In the money handling system according to the present embodiment, as described above, when the two money handling apparatuses face in the same direction (see FIG. 1), the front surfaces of the two money handling apparatuses (that is, the side surfaces of the front side in FIG. 1), which are close to the inlet opening and outlet opening of money, are aligned. In this case, the appearance of the money handling system composed of the coin handling apparatus 1 and the banknote handling apparatus 101 as seen from the store clerk side is improved.

In the money handling system according to the present embodiment, as described above, the stand 90 on which at least one money handling apparatus (specifically, the coin handling apparatus 1) is placed is provided with the slide mechanism (specifically, each guide rail 93, drawer 94 and caster 95). When the two money handling apparatuses face in the opposite directions (see FIG. 12), the side surfaces on the customer side of the two money handling apparatuses (that is, the side surfaces on the back side shown in FIG. 12) are aligned. In this case, the appearance of the money handling system composed of the coin handling apparatus 1 and the banknote handling apparatus 101 as seen from the customer side is improved. In the state of the coin handling apparatus 1 shown in FIG. 12, the customer can easily perform processing of the coins in the coin handling apparatus 1 as compared with the state where the coin handling apparatus 1 is located on the far side from the banknote handling apparatus 101 as seen from the customer side as shown in FIG. 11. Further, in this case, the money handling apparatus (more specifically, the coin handling apparatus 1) placed on the stand 90 provided with the orientation change mechanism and the slide mechanism may slide between the first position P1, the second position P2, and the third position P3. Note that the first position P1 is a position where the side surfaces on the customer side of the two money handling apparatuses are aligned when the two money handling apparatuses face in the opposite directions, the second position P2 is a position where the front surfaces of the two money handling apparatuses, which are close to the inlet opening and outlet opening of money, is aligned when the two money handling apparatuses face in the same direction, and the third position P3 is a position at which the orientation of the money handling apparatus in the horizontal direction can be changed by the orientation change mechanism. As a result, the side surfaces of the coin handling apparatus 1 and the banknote handling apparatus 101 can be aligned on the customer side and the store clerk side at the first position P1 and the second position P2, respectively. Moreover, at the third position P3, the orientation of the coin handling apparatus 1 in the horizontal direction can be changed by 180° without colliding with the banknote handling apparatus 101.

In the money handling system according to the present embodiment, as described above, the wiring for connecting the two money handling apparatuses (specifically, the coin handling apparatus 1 and the banknote handling apparatus 101) is disposed. The wiring extends between the stand 90 provided with the orientation change mechanism (specifically, the turntable 96) and the money handling apparatus (more specifically, the coin handling apparatus 1) placed on the stand 90 via the orientation change mechanism. In this case, the orientation change mechanism can change the orientation of the money handling apparatus in the horizontal direction while maintaining the state of connecting the two money handling apparatuses (specifically, the coin handling apparatus 1 and the banknote handling apparatus 101) by the wiring.

In the money handling system according to the present embodiment, as described above, processing of money is performed in different manners according to the orientation of the money handling apparatus (specifically, the coin handling apparatus 1) with respect to the stand 90. At this time, based on the orientation of the coin handling apparatus 1 with respect to the stand 90 detected by the orientation detector 152, processing manner of money may be automatically changed.

The money handling system according to the present embodiment is not limited to the above described aspect, and various modifications can be made.

For example, instead of placing the coin handling apparatus 1 on the stand 90 provided with the orientation change mechanism, the banknote handling apparatus 101 may be placed on the stand 90 provided with the orientation change mechanism, and the orientation of the banknote handling apparatus 101 in the horizontal direction may be changed by the orientation change mechanism.

In the money handling system shown in FIG. 1, the coin handling apparatus 1 and the banknote handling apparatus 101 are arranged so as to line up on the left and right, but the coin handling apparatus 1 or the banknote handling apparatus 101 may be used alone, and the coin handling apparatus 1 or the banknote handling apparatus 101 used alone is placed on the stand 90 provided with the orientation change mechanism.

In the stand 90 provided with the orientation change mechanism, installation of the slide mechanism composed of each guide rail 93, drawer 94 and each caster 95 may be omitted. That is, it may be possible to use the stand configured so that the slide mechanism is not disposed and only the orientation change mechanism such as the turntable 96 is disposed, and the orientation of the money handling apparatus in the horizontal direction can be changed by the orientation change mechanism.

The invention claimed is:

1. A money handling system comprising:

first and second money handling apparatuses each arranged adjacently and configured to handle money; and a placing unit on which the first money handling apparatus is placed, wherein each of the first and second money handling apparatuses comprises a housing, an inlet for feeding the money from an outside of the housing to an inside of the housing, and an outlet for feeding the money from the inside to the outside, the housing having a first side surface on which the inlet and the outlet are arranged, and a second side surface being opposite to the first side surface, wherein the first side surface of the second money handling apparatus faces in a first direction and the second side surface of the second money handling apparatus faces in a second direction being opposite to the first direction, and the placing unit is provided with an orientation change mechanism configured to change an orientation of the first side surface of the first money handling apparatus from the first direction to the second direction or from the second direction to the first direction, wherein the first side surface of the first money handling apparatus and the first side surface of the second money handling apparatus are aligned when the first side surface of the first money handling apparatus faces in the first direction by the orientation change mechanism, and the second side surface of the first money handling apparatus and the first side surface of the second money handling apparatus are aligned when the first side surface of the first money handling apparatus faces in the second direction by the orientation change mechanism, wherein the first money handling apparatus further comprises a shutter arranged at the outlet of the first money handling apparatus for opening and closing the outlet of the first money handling apparatus, wherein the shutter is configured not to be operated to close the outlet of the first money handling apparatus and the outlet of the first money handling apparatus is always accessible when the first money handling apparatus faces in the first direction, and the shutter is configured to be operated to close the outlet of the first money handling apparatus when the first money handling apparatus faces in the second direction.

2. The money handling system according to claim 1, further comprising an orientation detector configured to detect the orientation of the first money handling apparatus with respect to the placing unit.

3. The money handling system according to claim 1, wherein the orientation change mechanism includes a rotation mechanism configured to rotate the first money handling apparatus around an axis extending in a vertical direction.

4. The money handling system according to claim 1, wherein the placing unit is provided with a slide mechanism for horizontally sliding the first money handling apparatus.

5. The money handling system according to claim 1, wherein height levels of upper surfaces of the first and second money handling apparatuses are approximately the same.

6. The money handling system according to claim 1, wherein the first money handling apparatus placed on the placing unit slides by the slide mechanism between a first position in which the first side surfaces of the first money handling apparatus and the second side surface of the second money handling apparatus are aligned, and a second position in which the first side surface of the first and second money handling apparatuses are aligned.

7. The money handling system according to claim 1, wherein a wiring for connecting the two money handling apparatuses is disposed, and the wiring extends between the placing unit provided with the orientation change mechanism and the first money handling apparatus placed on the placing unit via the orientation change mechanism.

8. The money handling system according to claim 1, wherein the money handling system performs processing of money in different manners according to the orientation of the first money handling apparatus with respect to the placing unit.

9. The money handling system according to claim 1, wherein the first money handling apparatus further comprises a taken-in mechanism disposed at the outlet of the first money handling apparatus, wherein the taken-in mechanism is configured not to take forgotten money remaining in the outlet of the first money handling apparatus into the housing of the first money handling apparatus when the first money handling apparatus faces in the first direction, and is configured to take the forgotten money remaining in the outlet of the first money handling apparatus when the first money handling apparatus faces in the second direction.

10. The money handling system according to claim 1, wherein the first direction and the second direction are in a horizontal direction.

11. The money handling system according to claim 1, wherein the first money handling apparatus is a coin handling apparatus configured to handle coins, and the second money handling apparatus is a banknote handling apparatus configured to handle banknotes.

12. The money handling system according to claim 1, wherein the housing of each of the first and second money handling apparatus further includes a third side surface being between the first side surface and the second side surface, and a fourth side surface being between the first side surface and the second side surface and opposite to the third side surface, and the first and second money handling apparatuses are arranged adjacently so that one of the third and fourth side surfaces of the first money handling apparatus and one of the third and fourth side surfaces of the second money handling apparatus face each other.

13. A money handling system comprising:

first and second money handling apparatuses each arranged adjacently and configured to handle money; and a placing unit on which the first money handling apparatus is placed, wherein each of the first and second money handling apparatuses comprises a housing, an inlet for feeding the money from an outside of the housing to an inside of the housing, and an outlet for feeding the money from the inside to the outside, the housing having a first side surface on which the inlet and the outlet are arranged, and a second side surface being opposite to the first side surface, wherein the first side surface of the second money handling apparatus faces in a first direction and the second side surface of the second money handling apparatus faces in a second direction being opposite to the first direction, and the placing unit is provided with an orientation change mechanism configured to change an orientation of the first side surface of the first money handling apparatus from the first direction to the second direction or from the second direction to the first direction, wherein the first side surface of the first money handling apparatus and the first side surface of the second money handling apparatus are aligned when the first side surface of the first money handling apparatus faces in the first direction by the orientation change mechanism, and the second side surface of the first money handling apparatus and the first side surface of the second money handling apparatus are aligned when the first side surface of the first money handling apparatus faces in the second direction by the orientation change mechanism, wherein the first money handling apparatus further comprises a shutter arranged at the outlet of the first money handling apparatus for opening and closing the outlet of the first money handling apparatus, wherein the shutter at the outlet of the first money handling apparatus remains open when the first money handling apparatus faces in the first direction, and the shutter is capable of opening and closing the outlet of the first money handling apparatus when the first money handling apparatus faces in the second direction.

14. The money handling system according to claim 13, wherein the orientation change mechanism includes a rotation mechanism configured to rotate the first money handling apparatus around an axis extending in a vertical direction.

15. The money handling system according to claim 13, wherein the placing unit is provided with a slide mechanism for horizontally sliding the first money handling apparatus.

16. The money handling system according to claim 13, wherein the first money handling apparatus placed on the placing unit slides by the slide mechanism between a first position in which the first side surfaces of the first money handling apparatus and the second side surface of the second money handling apparatus are aligned, a second position in which the first side surfaces of the first and second money handling apparatuses are aligned.

17. The money handling system according to claim 13, wherein the first money handling apparatus further comprises a taken-in mechanism disposed at the outlet of the first money handling apparatus, wherein the taken-in mechanism is configured not to take forgotten money remaining in the outlet of the first money handling apparatus into the housing of the first money handling apparatus when the first money handling apparatus faces in the first direction, and is configured to take the forgotten money remaining in the outlet of the first money handling apparatus when the first money handling apparatus faces in the second direction.

18. The money handling system according to claim 13, wherein the first money handling apparatus is a coin handling apparatus configured to handle coins, and the second money handling apparatus is a banknote handling apparatus configured to handle banknotes.

19. The money handling system according to claim 13, wherein the housing of each of the first and second money handling apparatuses further includes a third side surface being between the first side surface and the second side surface, and a fourth side surface being between the first side surface and the second side surface and opposite to the third side surface, and the first and second money handling apparatuses are arranged adjacently so that one of the third and fourth side surfaces of the first money handling apparatus and one of the third and fourth side surfaces of the second money handling apparatus face each other.

* * * * *